(12) United States Patent
Savian et al.

(10) Patent No.: US 12,397,914 B1
(45) Date of Patent: Aug. 26, 2025

(54) PASSENGER BAYS ON A BLENDED WING BODY AIRCRAFT

(71) Applicant: JetZero, Inc., Long Beach, CA (US)

(72) Inventors: Scott Savian, Los Angeles, CA (US); Ian Geoffrey Scoley, Huntington Beach, CA (US)

(73) Assignee: JetZero, Inc., Long Beach, CA (US)

( * ) Notice: Subject to any disclaimer, the term of this patent is extended or adjusted under 35 U.S.C. 154(b) by 0 days.

(21) Appl. No.: 18/829,822

(22) Filed: Sep. 10, 2024

(51) Int. Cl.
*B64D 11/06* (2006.01)
*B64D 11/04* (2006.01)

(52) U.S. Cl.
CPC .......... *B64D 11/0606* (2014.12); *B64D 11/04* (2013.01); *B64D 11/0601* (2014.12)

(58) Field of Classification Search
CPC .. B64D 11/06; B64D 11/0601; B64D 11/0606
See application file for complete search history.

(56) References Cited

U.S. PATENT DOCUMENTS

| | | | |
|---|---|---|---|
| 5,909,858 A | 6/1999 | Hawley | |
| 6,568,632 B2 | 5/2003 | Page et al. | |
| 11,952,097 B1* | 4/2024 | Page | B64C 1/1423 |
| 2002/0145075 A1* | 10/2002 | Page | B64U 10/20 |
| | | | 244/36 |
| 2004/0217234 A1* | 11/2004 | Jones | A61M 21/02 |
| | | | 244/118.5 |
| 2014/0175215 A1* | 6/2014 | Gallant | B64F 1/30 |
| | | | 244/36 |
| 2017/0183078 A1* | 6/2017 | Cazals | B64C 1/1461 |
| 2018/0334254 A1* | 11/2018 | Saint-Marc | B64D 11/003 |
| 2022/0001974 A1* | 1/2022 | Page | B64C 25/04 |

* cited by examiner

*Primary Examiner* — Tye William Abell
(74) *Attorney, Agent, or Firm* — Caldwell Intellectual Property Law

(57) ABSTRACT

A blended wing body (BWB) aircraft including a blended wing body having a main body and wings with no clear demarcation between the wings and the main body along leading edges of the BWB aircraft, a passenger cabin located within the main body and more than one passenger bays located within the passenger cabin, wherein a perimeter of at least one passenger bay is demarcated by at least a divider and wherein the at least one passenger bay is substantially parallel to at least one leading edge of the BWB aircraft.

20 Claims, 7 Drawing Sheets

PASSENGER BAYS ON A BLENDED WING BODY AIRCRAFT

FIELD OF THE INVENTION

The present invention generally relates to the field of aircraft. In particular, the present invention is directed to passenger bays on a blended wing body aircraft.

BACKGROUND

Passenger seats on tube and wing aircraft are typically oriented in the same or similar directions. This is due to the fact that conventional tube and wing aircraft contain uniformity, and as a result, seats must be placed in the same of similar direction in order to maximize space and efficiency. As a result, variations within a cabin between differing tube and wing aircraft are minimal.

SUMMARY OF THE DISCLOSURE

In an aspect a blended wing body (BWB) aircraft is described. The BWB aircraft includes a blended wing body having a main body and wings with no clear demarcation between the wings and the main body along leading edges of the BWB aircraft, a passenger cabin located within the main body and more than one passenger bays located within the passenger cabin, wherein a perimeter of at least one passenger bay is demarcated by at least a divider and wherein the at least one passenger bay is substantially parallel to at least one leading edge of the BWB aircraft.

In another aspect, another blended wing body (BWB) aircraft is described. The BWB aircraft includes a blended wing body having a main body and wings with no clear demarcation between the wings and the main body along leading edges of the BWB aircraft, a passenger cabin located within the main body and more than one passenger bays located within the passenger cabin, wherein a perimeter of at least one passenger bay is demarcated by at least a divider, and wherein the at least one passenger bay is situated along at least one leading edge of the BWB aircraft.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to passenger bays on BWB aircraft. In an aspect, the present disclosure describes a BWB aircraft having a main body, wings, a passenger cabin and passenger bays. In an embodiment, the present disclosure describes a passenger bay having a perimeter that is demarcated by at least a divider. In aspects, the present disclosure describes passenger bays that are located along leading edges of the BWB aircraft and/or oriented parallel to a leading edge of the BWB aircraft.

Figure 1A:
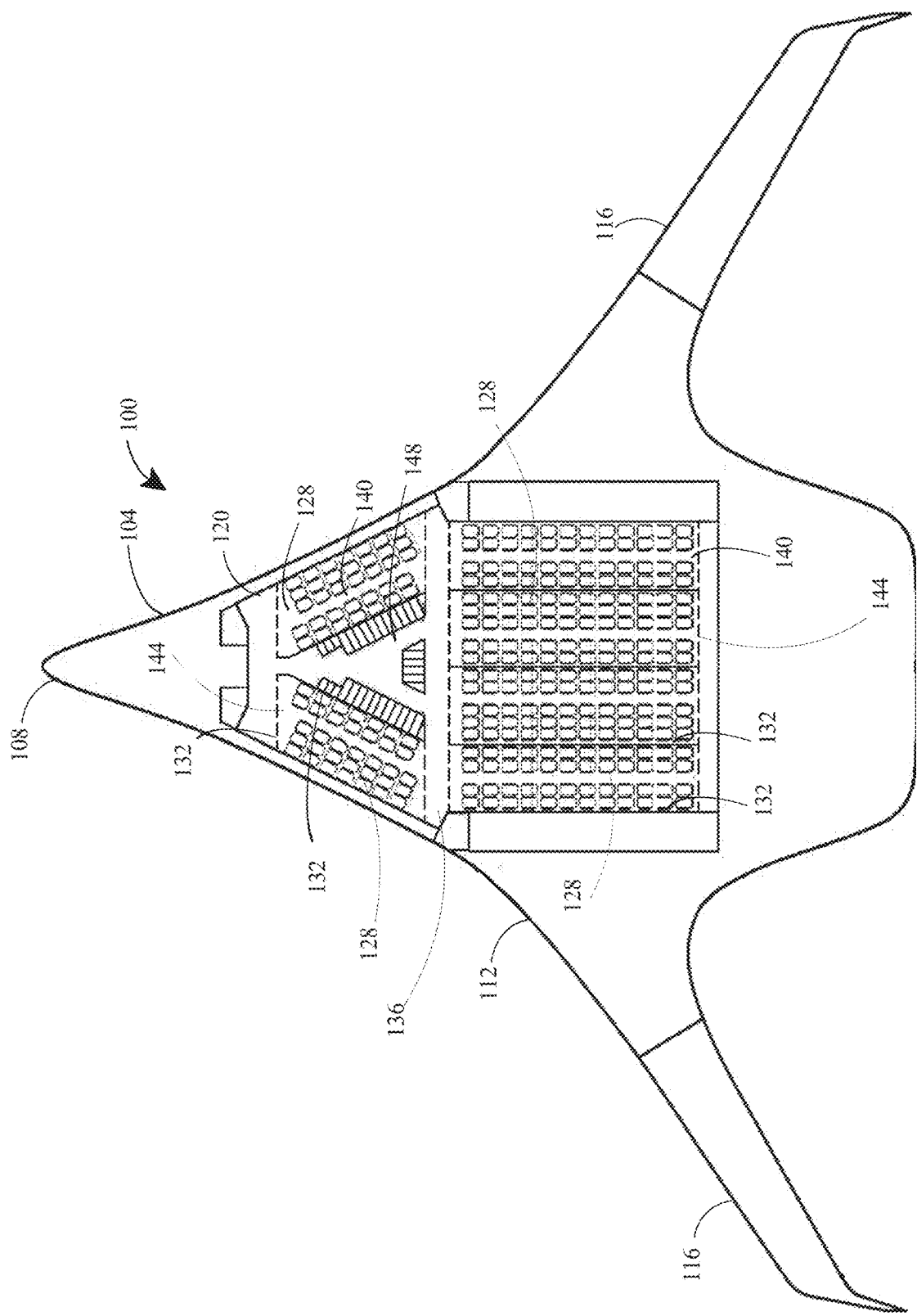
FIG. 1A is an exemplary illustration of a blended wing body aircraft.
Figure 1B:
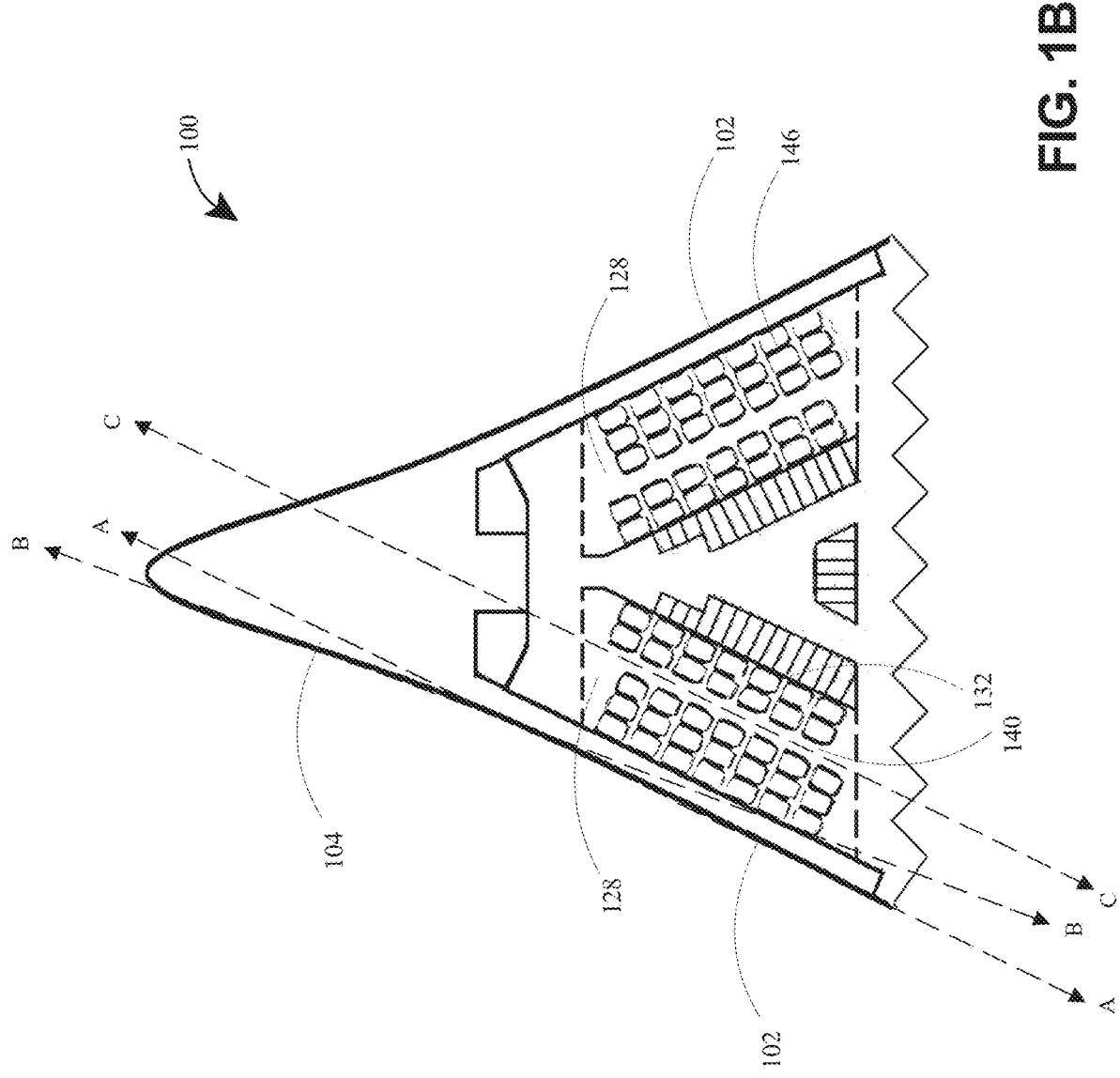
FIG. 1B is an exemplary illustration of a front section of the blended wing body aircraft.
Figure 1C:
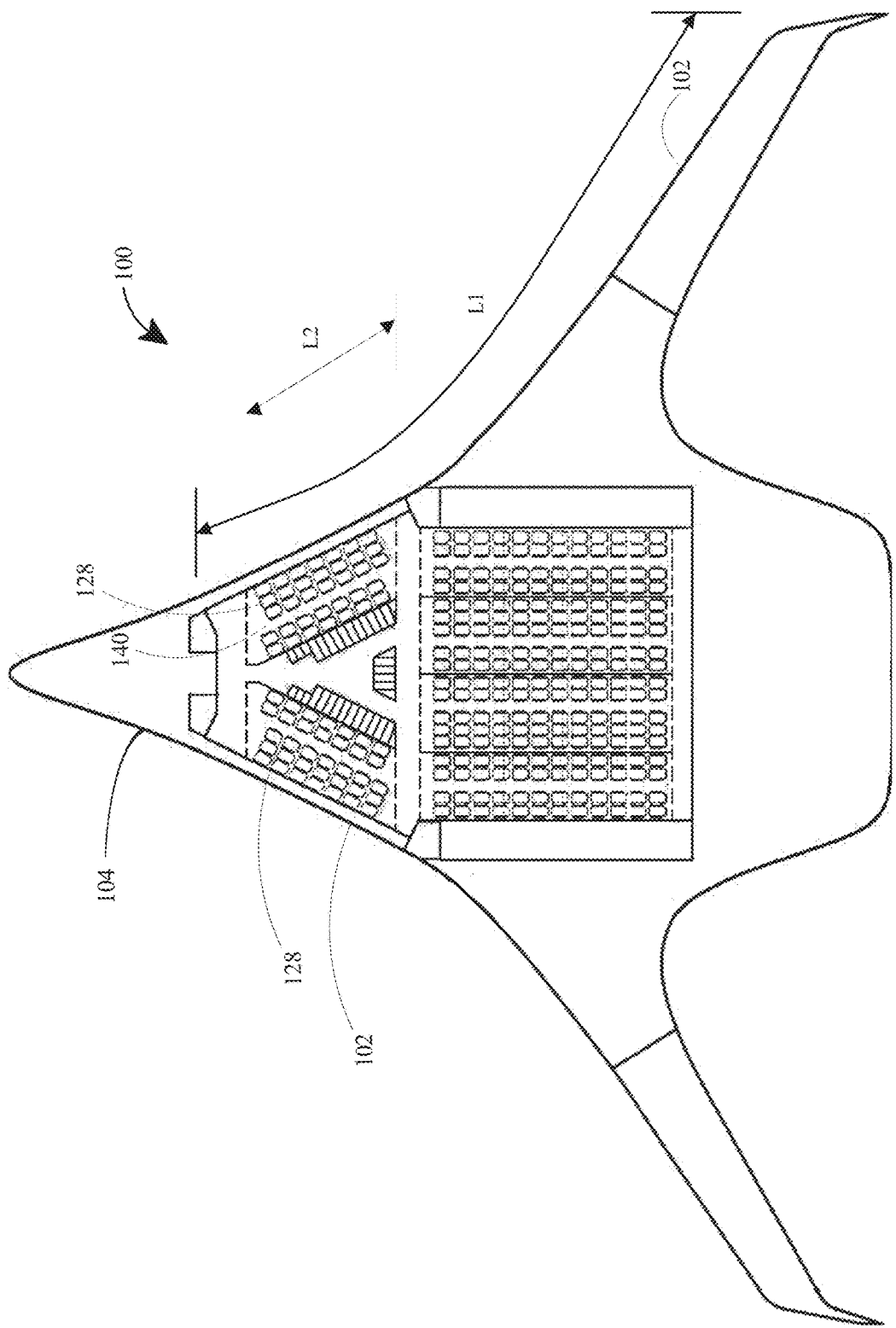
FIG. 1C is an exemplary illustration of the blended wing body aircraft.

Referring now to FIGS. 1A-C, an exemplary illustration of a blended wing body aircraft (BWB) 100 is described. BWB aircraft includes a blended wing body. As used herein, a "blended wing body aircraft" is a fixed-wing aircraft body having no clear or abrupt demarcation between wings and a main body of the aircraft along a leading edge 102 of the aircraft. For example, BWB aircraft 100 may have distinct wings and body structures, which are smoothly blended together with no clear dividing line or boundary feature between wings and a fuselage. This contrasts with a flying wing, which has no distinct fuselage, and a lifting body, which has no distinct wings. BWB aircraft 100 may or may not be tailless. In one or more embodiments, a potential advantage of BWB aircraft 100 may be to reduce wetted area and any accompanying drag associated with a tube and wing wing-body junction. In one or more embodiments, BWB aircraft 100 may also have a wide airfoil-shaped body, allowing entire aircraft to generate lift and thereby facilitate reduction in size and/or drag of wings 116. In one or more embodiments, BWB aircraft 100 may be understood as a hybrid shape that resembles a flying wing, but also incorporates features from tube and wing aircraft. In one or more embodiments, this combination may offer several advantages over tube-and-wing airframes. In one or more embodiments, a BWB airframe may help to increase fuel economy and create larger payload (cargo or passenger) volumes within BWB aircraft 100. BWB aircraft 100 may allow for advantageous interior designs. For instance, cargo can be loaded and/or passengers can board from the front or rear of the aircraft. A cargo or passenger area may be distributed across a relatively wide (when compared to tube-wing aircraft) fuselage, providing a large usable volume.

With continued reference to FIGS. 1A-C, BWB aircraft may include leading edges 102. A "leading edge" for the purposes of this disclosure refers to the forward most edge of a wing or any other airfoil component on an aircraft. An "airfoil component" for the purposes of this disclosure refers to aircraft wings, propellers or any other aerodynamic surfaces on an aircraft used to generate lift during flight. For example, and without limitation, airfoil component may include a leading edge of an aircraft wing, a trailing edge of the aircraft wing, a chord line and/or the like. In one or more embodiments, leading edge 102 may include the first part of portion of a wing or airfoil component that encounters airflow as an aircraft moves forward during flight. In one or more embodiments, on a tube and wing aircraft, leading edge 102 may include a distinct line running along a front of the wings. In one or more embodiments, on BWB aircraft 100, leading edge 102 may blend across a width of BWB aircraft. In one or more embodiments, leading edge 102 may include a continuous surface with no clear demarcation extending from wings and onto main body of BWB aircraft. In one or more embodiments, at least a portion of leading edge 102 may be situated along axis A-A as illustrated in FIG. 1B. In one or more embodiments, leading edge 102 may intersect main body 104 at a point on axis B-B as illustrated in FIG. 1B. In one or more embodiments, a portion of leading edge 102 may be situated along axis A-A, whereas a portion of main body 104 may be situated along axis B-B. In one or more embodiments, leading edge 102 may connect to main body 104 at a cross point between axis A-A and axis B-B. In one or more embodiments, leading edge 102 may extend from a wingtip up until a cross point between axis A-A and axis B-B. In one or more embodiments, BWB aircraft 100 may include a leading edge 102 on opposing sides of BWB aircraft 100. In one or more embodiments, a first leading edge 102 may extend from a first wing tip to main body 104 and a second leading edge 102 may extend from a second wing tip to main body. In one or more embodiments, a first leading edge 102 may be located on a port side of BWB aircraft 100, and a second leading edge 102 may be located on a starboard side of BWB aircraft 100. In one or more embodiments, leading edge 102 may merge into main body 104 at a cross point between axis A-A and axis B-B. In one or more embodiments, leading edge 102 may be situated at a non-zero angle in comparison to main body wherein axis A-A and axis B-B may contain a non-zero angle in reference to one another. In one or more embodiments, Axis A-A and axis B-B may contain a non-zero angle wherein Axis A-A and Axis B-B intersect at precisely one point.

Still referring to FIGS. 1A-C, in one or more embodiments, BWB aircraft 100 may include a main body 104. As used herein, a "main body" of a BWB aircraft is a portion of the BWB aircraft that is capable of holding passengers and/or cargo. In one or more embodiments, main body 104 may include a fuselage of BWB aircraft 100. In one or more embodiments, main body 104 may be contrasted to a tube and wing body aircraft, wherein the aircraft tube and wing body contains a clear transition between the fuselage and the aircraft wing.

Still referring to FIGS. 1A-C, BWB aircraft 100 may include at least a fuselage. As used herein, a "fuselage" of an aircraft is a main body of the aircraft. In one or more embodiments, a fuselage of BWB aircraft 100 may include an entirety of the BWB aircraft 100 except for nose portion 108, wings 116, empennage, nacelles, and control surfaces. In one or more embodiments, fuselage may contain an aircraft's payload. At least a fuselage may comprise structural elements that physically support a shape and structure of BWB aircraft 100. Structural elements may take a plurality of forms, alone or in combination with other types. Structural elements may vary depending on construction type of BWB aircraft 100 and specifically, fuselage.

Still referring to FIGS. 1A-C, in one or more embodiments, BWB aircraft 100 may include a nose portion 108. As used herein, a "nose portion" is a portion of BWB aircraft 100 forward of the aircraft's fuselage. Nose portion 108 may include a cockpit (for manned aircraft), canopy, aerodynamic fairings, windshield, and/or structural elements required to support mechanical loads. Nose portion 108 may also include pilot equipment such as pilot seats, control interfaces, gages, displays, inceptor sticks, throttle controls, collective pitch controls, communication equipment, and the like. Nose portion 108 may comprise a swing nose configuration. A swing nose may be characterized by an ability of the nose to move, manually or automatedly, into a differing orientation than its flight orientation to provide an opening for loading a payload into aircraft fuselage from the front of the aircraft. Nose portion 108 may be configured to open in a plurality of orientations and directions.

Still referring to FIGS. 1A-C, in one or more embodiments, BWB aircraft 100 may include a transition 112. As used herein, a "transition" is a section of a BWB aircraft between a main body and a wing. In one or more embodiments, transition 112 may increase in chord and thickness from wing 116 in a direction of main body 104.

Still referring to FIGS. 1A-C, at least a flight component may include, in non-limiting examples, wings 116, empennages, nacelles, control surfaces, fuselages, and landing gear. In embodiments, an empennage may be disposed at the aftmost point of BWB aircraft 100. Empennage may comprise a tail of BWB aircraft 100, further comprising rudders, vertical stabilizers, horizontal stabilizers, stabilators, elevators, trim tabs, among others. At least a portion of empennage may be manipulated directly or indirectly by pilot commands to impart control forces on a fluid in which the BWB aircraft 100 is flying. Manipulation of these empennage control surfaces may, in part, change an aircraft's heading in pitch, roll, and yaw.

Still referring to FIGS. 1A-C, in one or more embodiments, BWB aircraft 100 may include a plurality of wings 116. As used herein, a "wing" is a fin or an extended member that produces lift for an aircraft while an aircraft is traveling through air. In one or more embodiments, at least a flight component may include a wing 116. Wings 116 may include structures which include airfoils configured to create a pressure differential resulting in lift. In one or more embodiments, wings 116 may be disposed on a left and right side of BWB aircraft 100 symmetrically, at a point between nose portion 108 and empennage. Wings 116 may include a plurality of geometries in planform view, swept swing, tapered, variable wing, triangular, oblong, elliptical, square, among others. Wings 116 may be blended into the body of the aircraft such as in a BWB aircraft 100 where no strong delineation of body and wing 116 exists. A wing's cross section geometry may comprise an airfoil. As used herein, an "airfoil" is a shape specifically designed such that a fluid flowing on opposing sides of it exert differing levels of pressure against the airfoil. In one or more embodiments, a bottom surface of an aircraft may be configured to generate a greater pressure than does a top surface, resulting in lift. A wing 116 may comprise differing and/or similar cross-sectional geometries over its cord length, e.g., length from wing tip to where wing meets the aircraft's body. One or more wings may be symmetrical about an aircraft's longitudinal plane, which comprises a longitudinal or roll axis reaching down a center of the aircraft through the nose and empennage, and the aircraft's yaw axis. In one or more embodiments, wings 116 may include controls surfaces configured to be commanded by a pilot and/or autopilot to change a wing's geometry and therefore its interaction with a fluid medium. Flight component may include control surfaces. Control surfaces may include without limitation flaps, ailerons, tabs, spoilers, and slats, among others. In one or more embodiments, control surfaces may be disposed on wings in a plurality of locations and arrangements. In one or more embodiments, control surfaces may be disposed at leading and/or trailing edges of wings 116, and may be configured to deflect up, down, forward, aft, or any combination thereof.

With continued reference to FIGS. 1A-C, BWB aircraft 100 and/or main body 104 may include a passenger cabin 120. A "passenger cabin" for the purposes of this disclosure refers to the portion of BWB aircraft 100 wherein passengers are situated during flight. In one or more embodiments, passenger cabin 120 may include passenger seats, lavatories, walkways, aisles, compartments for carry-on baggage and the like. In one or more embodiments, passenger cabin 120 may include passenger seats. In one or more embodiments, passenger cabin 120 may include more than two passenger aisles, wherein each passenger aisle may include one or more passenger seats on each side of the passenger aisle. In one or more embodiments, passenger cabin 120 may include two or more passenger aisles, wherein the two or more passenger aisles are parallel to each other. A "passenger aisle" for the purposes of this disclosure is a designated walkway on an aircraft in which passengers may travel from one portion of BWB aircraft 100 to another. In one or more embodiments, passenger cabin 120 may include 3 or 4 passenger aisles. The passenger aisles within passenger cabin 120 may be parallel to one another. Additionally, or alternatively, one or more passenger aisles may be perpendicular to one or more passenger aisles. In one or more embodiments, Passenger cabin 120 may be located in a lateral middle of main body 104. As used in this disclosure, a "lateral" direction of an aircraft may refer to a direction running from wing tip to wing tip. Lateral direction may be substantially orthogonal to a nose to tail direction.

With continued reference to FIGS. 1A-C, passenger cabin 120 may include a single deck with cargo and passengers, each substantially located on or above the single deck. As used in this disclosure, a "deck" on an aircraft is platform upon which one or more of passengers and cargo may be stored. A single deck may be contrasted with a two-deck configuration analogously to a single-story building contrasted to a two-story building. Single deck may further include a cargo store. A "cargo store" is a location in which cargo can be held. For example, cargo may include baggage that passengers have brought aboard on BWB aircraft 100. Cargo store may be located within passenger cabin 120 such as above passenger seats. Cargo store may also be located laterally outside of passenger cabin 120. In one or more embodiments, cargo store may be laterally adjacent to passenger cabin 120. In some cases, cargo store may be located within a wing 116 portion of the BWB aircraft 100.

With continued reference to FIGS. 1A-C, passenger cabin 120 may include at least one passenger row wherein the at least one passenger row contains 8 or more seats. The 8 or more seats may be divided by a single passenger aisle, a plurality of passenger aisles, a divider 132, and/or a plurality of dividers 132. The 8 or more seats may all be of equal height, width length. In one or more embodiments, the passenger cabin 120 contains a single passenger row having more than 8 seats. In one or more embodiments, passenger cabin 120 may include a plurality of rows wherein the plurality of rows all have 8 or more seats.

With continued reference to FIGS. 1A-C, aircraft may include one or more entry doors wherein one or more entry doors are used to access main body 104 or passenger cabin 120. One or more entry doors may be located on the same side of BWB aircraft 100. In one or more embodiments, one or more entry doors may be located on a right side and a left side of main body 104. In one or more embodiments, one or more entry doors may be located on the transition.

With continued reference to FIGS. 1A-C, passenger cabin 120 may include an ascending seat layout. "Ascending seat layout" as described in this disclosure is an arrangement of seats in passenger cabin 120 wherein a number of seats within a first row contains the same or less seats than a second row. For example, an ascending layout may include 4 seats in a first row, 6 seats in a second row and 8 seats in a third row. In another non limiting example, ascending layout may include 6 seats in a first row, 6 seats in a second row and 8 seats in a third row. In one or more embodiments, passenger cabin 120 may be ascending in shape wherein a rear portion of passenger cabin 120 is wider than a front portion of passenger cabin 120. In one or more embodiments, a portion of passenger cabin 120 may include an ascending layout.

With continued reference to FIGS. 1A-C, cargo store may include a cargo entry door. Cargo entry door may be used to place cargo on BWB aircraft 100. cargo entry door may be a mechanical door wherein cargo entry door contains a latch that can be used to open cargo entry door and enter into cargo store. Cargo entry door may be automated such that cargo entry door is electronically opened and closed using a computing device. cargo entry door may be located on main body 104. In one or more embodiments, cargo entry door may be located on a lower aft surface of the main body 104.

With continued reference to FIGS. 1A-C, passenger cabin 120 may include one or more passenger bays 128. A "passenger bay" for the purposes of this disclosure refers to a portion of passenger cabin 120 configured exclusively to seat passengers. For example, and without limitation, passenger cabin 120 may include lavatories and passenger bays 128, wherein lavatories may be located outside of passenger bays 128. In one or more embodiments, passenger bays 128 may be separated by dividers 132. A "divider" for the purposes of this disclosure is an object or structure configured to create a separation between a passenger bay and other portions of a passenger cabin. For example, and without limitation, divider 132 may include walls, windows, structural elements, access routes 144 (as described in further detail below) and/or the like. In one or more embodiments, dividers 132 may include walls that at least partially enclose passenger bay 128 from other portions of cabin. In one or more embodiments, divider 132 may include cross aisles, wherein the cross aisles may separate two passenger bays. In an embodiment, a passenger bay 128 may be separated by walls and cross aisles 136 wherein entrance or exit into or out of passenger bay 128 would require the use of cross aisles 136 (as described in further detail below). In one or more embodiments, dividers 132 may separate two or more passenger bays 128. In one or more embodiments, dividers 132 may separate passenger bays 128 from cross aisles 136. In one or more embodiments, dividers 132 may include physical structures that separate two or more passenger bays. In one or more embodiments, passenger bays may be separated from one another using dividers 132 wherein for example, passengers must exit a first passenger bay and utilize a cross aisle in order to access a second passenger bay. In one or more embodiments, dividers 132 may include structural elements as described in further detail below.

With continued reference to FIGS. 1A-C, divider 132 may demarcate at least a portion of a perimeter of passenger bay 128. In one or more embodiments, perimeter of passenger bay 128 may be demarcated by at least divider 132. For the purposes of this disclosure, "demarcation" refers to the action of creating a boundary or perimeter around an object. For example, and without limitation, a wall fence may act as a demarcation for a yard wherein the fence indicates or illustrates the boundary of the yard. In one or more embodiments, perimeter of passenger bay 128 may be demarcated by at least divider 132 wherein divider 132 may indicate at least a portion of a boundary of passenger bay 128. In one or more embodiments, perimeter of passenger bay 128 may be demarcated by dividers 132, cross aisles 136, walls of passenger cabin 120, boundaries of passenger cabin 120 and/or the like. In one or more embodiments, perimeter of passenger bay may be demarcated by at least divider 132, wherein at least one divider 132 may demarcate at least one portion of a perimeter of passenger bay 128. For example, and without limitation, at least one wall, at least one cross aisle 136 and/or the like may be used to demarcate one portion of perimeter of passenger bay 128. In one or more embodiments, a perimeter of passenger bay 128 may be surrounded by cross aisles 136, structural elements, walls and/or the like wherein the perimeter of passenger bay 128 may be defined by the surrounded cross aisles 136, structural elements, walls and/or the like. In one or more embodiments, perimeter may be demarcated by at least a divider 132 wherein divider 132 may indicate an end or boundary of passenger bay 128. For example, and without limitation, a wall may indicate the end of passenger bay 128 and the beginning of another passenger bay 128. In another non limiting example, a cross aisle 136 may indicate an end of passenger bay 128 and/or a beginning of cross aisle 136. In one or more embodiments, dividers 132 may be used to determine a perimeter of passenger bay 128. In one or more embodiments, passenger bay 128 may contain a plurality of sides wherein at least one or more sides may include divider 132. In one or more embodiments, a perimeter of passenger bay 128 may be defined by walls, cross aisles 136, dividers 132 and/or any other separation between passenger seats aside from bay aisles 140 (as described in further detail below). In one or more embodiments, physical elements preventing movement from one passenger seat to another (e.g. walls, structural elements, etc.) and cross aisles 136 may be used to demarcate passenger bay 128. In one or more embodiments, in one or more embodiments, a perimeter of passenger cabin may be defined as a boundary determined by all passenger seats that can be accessed by a single bay aisle 140. In one or more embodiments, each passenger bay may include a single bay aisle 140 wherein a perimeter of passenger bay may be defined as a border surrounding all passenger seats that can be accessed by the single bay aisle 140.

With continued reference to FIGS. 1A-C, in one or more embodiments, each passenger bay 128 within passenger cabin 120 may include a distinct and separate portion of passenger cabin 120 which is configured to hold passengers. In one or more embodiments, passenger bays 128 may be separated by a wall, divider 132, structural elements and/or element indicating a separation between two or more passenger bays 128. In one or more embodiments, more than one passenger bays 128 may be located within passenger cabin 120 wherein each passenger bay 128 may be separated by a wall, divider 132, a structure and the like. In one or more embodiments, passenger bays 128 within passenger cabin 120 may differ in length, width, seat size, seat pitch, seat width, row size and the like. For example, and without limitation, a first passenger bay 128 may include 4 seats within each given row, while a second passenger bay 128 may include 5 seats within a given row. In one or more embodiments, seats within passenger bay 128 may differ in size, wherein a first passenger bay 128 may contain a larger seat size than a second passenger bay 128.

With continued reference to FIGS. 1A-C, passenger bays 128 may be separated by structural elements. "Structural elements," as described in this disclosure, are weight bearing supports that are configured to resist the loads that are placed on BWB aircraft 100. Loads may include the weight of BWB aircraft 100 along with other pressurization loads that may be placed on portions of BWB aircraft 100. Structural elements may be configured to reduce flexion of the skin of an aircraft to provide a stable and secure aircraft. In one or more embodiments, structural elements may include frames, struts, beams, formers, stringers, longerons, interstitials, ribs, structural skins, straps, spars, panels, pillars, and the like. In one or more embodiments, structural elements may include a structural frame. As used in the current disclosure, a "structural frame" is a structural element that is incrementally placed along the longitudinal axis of BWB aircraft 100. The structural frame may be one of the primary structural elements of the main body 104 of BWB aircraft 100. The arrangement may provide consistent support and stability to BWB aircraft 100's structure, distributing loads evenly along the length of BWB aircraft 100. The structural frame of an aircraft may include elements like bulkheads, frames, and ribs. Being one of the primary structural elements of BWB aircraft 100's main body 104, or fuselage, the structural frame may be used to maintain the fuselage's shape and strength. The structural frame may form a part of, or contributes to, BWB aircraft 100's semi-monocoque or monocoque construction. In such designs, the structural skin of BWB aircraft 100 contributes to structural strength, supplemented by these structural frame. The structural frame may form a rib-like structure, curving around the main body's 104 circumference, providing a skeleton that supports BWB aircraft 100's structural skin and other structural components. In one or more embodiments, structural elements may extend vertically from a lower surface of passenger cabin 120 in a direction of an upper surface of passenger cabin 120. In one or more embodiments, structural elements may extend from a floor surface of passenger cabin 120 in a direction of a roof surface of passenger cabin 120. In one or more embodiments, structural element may include and/or be included in an aircraft structure as described in U.S. Non provisional application Ser. No. 18/417,690, filed on Jan. 19, 2024, entitled "CENTER-BODY PRESSURE VESSEL WITH AN ARCHED COMPRESSION SURFACE" the entirety of which is incorporated herein by reference.

With continued reference to FIGS. 1A-C, structural elements may also consist of a wall extending along main body 104 and/or passenger cabin 120 of blended wing aircraft. Structural elements may extend laterally or longitudinally along passenger cabin 120. Structural elements may be made of aluminum, carbon fiber or a similar material suitable for aircrafts or high-pressure environments requiring lighter materials. In one or more embodiments, structural elements may be made of a carbon fiber material. In one or more embodiments, structural elements include a wall, wherein the wall splits the passenger cabin 120 of the blended wing aircraft into multiple cabin bays.

With continued reference to FIGS. 1, one or more structural elements may be substantially parallel to each other. This may include the structural frame that is configured to run parallel along the longitudinal axis of BWB aircraft 100. In some cases, the one or more structural elements may be substantially perpendicular. This may include the stringers that may be configured perpendicular to the structural frame.

In one or more embodiments, structural elements may be connected to a skin to resist pressurization loads and to stabilize the skin in terms of buckling and core crushing. In one or more embodiments, structural elements May vertically extend from a first distal end of passenger cabin 120 towards a second distal end of passenger cabin 120. In other embodiments, structural elements may be positioned along a longitudinal axis. Additionally, or alternatively, structural elements may be concealed within a flat surface such as a wall. For example, similar to a house in which the beams of the house are concealed behind a plastered wall, structural elements may be concealed within a wall of BWB aircraft 100.

With continued reference to FIG. 1, structural elements and/or dividers 132 may be configured to contain a pressure vessel of BWB aircraft 100. As used herein, a "pressure vessel" is a closed container, compartment, storage, or vessel that is designed to withstand pressures higher or lower than the surrounding atmosphere. For example, at higher altitudes an interior of the main body of BWB aircraft 100 may contain a large pressure difference in comparison to the atmospheric pressure such that the main body of BWB aircraft 100 is a pressure vessel. In one or more embodiments, pressure vessel may include passenger cabin 120 wherein passenger cabin 120 may be pressurized relative to atmosphere. In one or more embodiments, BWB aircraft 100 and/or pressure vessel may include a flat sides pressure vessel. As described in this disclosure "flat sided" refers to a surface that does contains minimal curvature. As opposed to conventional circular pressure vessels, similar to tube and wings aircraft, which may resist pressure with substantially pressure tension in the shell, a flat sided pressure vessel on an aircraft resists pressure by placing an aircraft skin in bending. Flat-sided pressure vessel may contain one or more walls or surfaces that are substantially flat. In some embodiments, flat-sided pressure vessel may include a bottom surface of a BWB aircraft 100. A bottom of surface of BWB aircraft 100 may be substantially flat or a portion of bottom of BWB aircraft 100 may be substantially flat. Flat sided pressure vessel may further include an undercarriage of BWB aircraft 100, wherein the undercarriage refers to an area underneath a main body or a wing of an aircraft. In one or more embodiments, a main body of an aircraft structure may include structural elements wherein structural elements may be utilized to prevent crushing of flat-sided pressure vessel. In one or more embodiments, an outer mold line of BWB aircraft 100 may include a portion of flat-sides pressure vessel. In one or more embodiments, an outer mold line sin of BWB aircraft may be configured to resist pressure or a portion thereof of flat sided pressure vessel. In one or more embodiments, structural elements may be configured to contain pressure vessel wherein structural elements may be configured to resist loads acting on BWB aircraft. In one or more embodiments, loads may act inwards and/or outwards on a dorsal side of BWB aircraft 100 and/or a belly of BWB aircraft 100. In one or more embodiments, structural elements may be configured to contain pressure vessel wherein structural elements may be intension during a flight in order to contain loads acting on BWB aircraft. In one or more embodiments, structural elements may prevent separation of an upper and lower surface of an aircraft during flight. In one or more embodiments, structural elements may resist loads acting on main body of BWB aircraft 100. In one or more embodiments, pressure vessel may include an aft pressure bulkhead as described in further detail below.

With continued reference to FIGS. 1A-C, structural elements may serve as walls and/or dividers 132 within passenger cabin 120. In one or more embodiments, structural elements may divide passenger cabin 120 into more than one passenger bays 128. In one or more embodiments, more than one passenger bays 128 may be situated parallel to one another wherein the passenger bays 128 may be separated by more than one structural elements situated in parallel to one another. In one or more embodiments, passenger bays 128 may be adjacent to and/or parallel to one another. In one or more embodiments, passenger bays 128 may be located adjacent to one another wherein passenger bays may be situated in the same longitudinal direction. In one or more embodiments, passenger bays may be situated in the same longitudinal direction in instances in which the length of the passenger bays begin and end in substantially the same portion of the aircraft along a longitudinal axis. In one or more embodiments, a longitudinal axis of BWB aircraft may be defined as the direction from the nose portion 108 of BWB aircraft towards a tail of BWB aircraft. In one or more embodiment, structural elements may extend from a floor surface of passenger cabin 120 in a vertical direction towards the ceiling of passenger cabin 120.

With continued reference to FIGS. 1A-C, passenger cabin 120 may include one or more cross aisles 136. A "cross aisle" for the purposes of this disclosure is a passenger aisle that can be utilized to travel between to or from one or more passenger bays 128. For example, and without limitation, cross aisle 136 may include a passenger aisle which allows an individual to access a second passenger cabin 120, a passenger aisles that allows an individual to access main body 104 in order to access a passenger cabin 120 and the like. In one or more embodiments, cross aisles 136 may allow individuals to travel between bays, to travel to and/or from lavatories and/or other portions of BWB aircraft 100. In one or more embodiments, cross aisle 136 May include cross aisles 136 within passenger cabin 120 that allow passengers to travel to and/or from passenger bay 128. In one or more embodiments, one or more cross aisles 136 may extend laterally from a first wing of BWB aircraft in a direction of a second wing of BWB aircraft. In one or more embodiments, cross aisles 136 may be analogous to bay aisles 140. A "bay aisle" for the purposes of this disclosure if a passenger aisle located within a passenger bay 128 and configured to allow passengers to travel through the passenger bay 128. In one or more embodiments, bay aisles 140 may be utilized for traveling or moving within passenger bay 128 while cross aisles 136 may allow for traveling to and/or from passenger bays 128. In one or more embodiments, cross aisles 136 may be situated perpendicular to bay aisles 140. In one or more embodiments, bay aisles 140 may extend along a longitudinal axis of BWB aircraft 100 whereas cross aisles 136 may extend along a lateral axis of BWB aircraft 100. In one or more embodiments, one or more bay aisles 140 may be situated non-orthogonally to one or more cross aisle 136. In one or more embodiments, one or more bay aisles may be situated non-orthogonal to one or more cross aisles wherein an angle between the bay aisle 140 and the cross aisle is not 90 degrees. In one or more embodiments, one or more bay aisles 140 may be situated non-orthogonal relative to one or more cross aisles wherein an angle between the bay aisle 140 and the cross aisle 136 is less than 90 degrees. In one or more embodiments, at least one bay aisle 140 may be linked to at least one cross aisle 136, wherein the at least one bay aisle 140 is situated non-orthogonally relative to the at least one cross aisle 140. In one or more embodiments, cross aisles 136 may include egress routes on BWB aircraft 100. An "egress route" for the purposes of this disclosure refers to a path for passengers to exit BWB aircraft 100. In one or more embodiments, egress route may include a route for which passengers may exit BWB aircraft 100. In one or more embodiments, egress routes may include aisles that are configured to boarding and/or off deboarding an aircraft. In one or more embodiments, egress routes may include one or more passenger doors at each end of the egress route. In one or more embodiments, passenger bays 128 may be linked to one another through cross aisles 136. "Linked" for the purposes of this disclosure refers to a connection between two portions of a passenger cabin 120. For example, and without limitation, passenger bays 128 may be linked to one another through cross aisles 136 wherein a passenger may utilize a cross aisle 136 to travel from one passenger bay 128 to another passenger bay 128. In one or more embodiments, cross aisles 136 may link passenger bays 128 to lavatories wherein passengers may utilize cross aisles 136 to travel between passenger bays 128 and lavatories. In one or more embodiments, a cabin door allowing passengers to enter passenger cabin 120 may be linked to passenger bays 128, wherein a passenger may travel through one or more cabin doors and into one or more passenger bays 128. In one or more embodiments, passenger bays 128 may be linked to cross aisles 136 through access routes 144. An "access route" for the purposes of this disclosure is a designated opening that allows for movement from one portion of BWB aircraft 100 onto another portion of BWB aircraft 100. For example, and without limitation, each passenger bay 128 may include a door, a door frame and/or a lack of obstacles that would allow a passenger to access cross aisle 136 from passenger bay 128. In one or more embodiments, access routes 144 may be illustrated as dashed solely in FIGS. 1A-C. In one or more embodiments, ends of passenger bays 128 may contain access routes 144 which allow passengers to access a cross aisle 136. In one or more embodiments, access route 144 may include a lavatory door wherein a passenger may travel through the lavatory door from the cross aisle 136 in order to access cross aisle 136. In one or more embodiments, access to any portion of passenger cabin 120 may include the use of one or more access routes 144. In one or more embodiments, access routes 144 may include an entrance portion or an extra portion of passenger bays 128 wherein passengers may enter or exit passenger bays 128 through the entrance or exit. In one or more embodiments, access routes 144 may be located only at ends of passenger bays 128 wherein passengers may only access passenger bays 128 only from a front or rear. In one or more embodiments, passenger bays 128 may be surrounded by walls, dividers 132, structural elements and/or the like. In one or more embodiments, passenger bays 128 may contain openings within and/or between the walls, dividers 132 and/or structural elements in order to allow for passengers to access passenger bay 128.

Referring now specifically to FIG. 1C, passenger bay 128 may be situated along a leading edge 102 of BWB aircraft. For the purposes of this disclosure "situated along" as used in reference to a placement of passenger bay 128 along leading edge 102 refers to a placement of passenger bay 128 within a longitudinal boundary as defined by a length L1 of leading edge 102. In one or more embodiments, passenger bay 128 may be situated along leading edge 102 wherein passenger bay 128 may be oriented in a same or similar direction as leading edge 102. In one or more embodiments, passenger bay 128 may be situated along leading edge 102 wherein a first distal end of passenger bay 128 and a second distal end of passenger bay 128 may be located along and/or within a length L1 of leading edge 102. In one or more embodiments, passenger bay 128 may be situated along leading edge 102 wherein a length L2 of passenger bay 128 may be located within a length L1 of leading edge 102. In one or more embodiments, passenger bay 128 may be situated along leading edge 102 wherein a length L2 of passenger bay 128 may extend along a length L1 of leading edge 102. In one or more embodiments, passenger bay 128 may be situated along leading edge 102 wherein leading 102 and passenger bay 128 may share at least a boundary, a portion of a perimeter and/or the like. In one or more embodiments, passenger bay 128 may be situated along leading edge 102 wherein passenger bay 128 and leading edge 102 share a border, wall, and/or boundary. In one or more embodiments, passenger bay 128 may be situated along at least a portion of leading edge 102 of BWB aircraft. In one or more embodiments, passenger bay 128 may be situated along leading edge 102 of BWB aircraft wherein a length L2 of passenger bay 128 may extend along a length L1 of leading edge 102. In one or more embodiments, passenger bay 128 may extend along at least a portion of length L1 of leading edge 102. In one or more embodiments, passenger bay 128 may extend along at least one leading edge 102 wherein a first end of passenger bay and a second end of passenger bay may be located along length L1 of leading edge 102. In one or more embodiments, a length L2 of passenger bay 128 may extend from a first end of passenger bay 128 to a second and opposing end of passenger bay 128. In one or more embodiments, passenger bay 128 may extend along leading edge 102 wherein Length L2 of passenger bay may extend at least a portion of length L1 of leading edge 102. In one or more embodiments, leading edge 102 and/or length L1 may extend from a wingtip of BWB aircraft to main body 104. In one or more embodiments, passenger bay 128 may extend along a portion of leading edge 102. In one or more embodiments, passenger bay 128 may extend along leading edge 102 wherein an entire length of passenger bay 128 as defined by L1 may be situated along at least a portion of Length L2 of leading edge 102. In one or more embodiments, a substantial portion of length L2 of passenger bay 128 may extend along a portion of leading edge 102. For example, and without limitation 90% of length L2 or more may extend along a portion of leading edge 102. In one or more embodiments, passenger bay 128 may extend along a leading edge 102 located near main body 104 wherein a plurality of passenger rows may be situated along a portion of leading edge 102 and/or a portion of length L1 of leading edge 102. In one or more embodiments, passenger bay 128 may extend along a portion of leading edge 102 wherein longitudinal ends of passenger bay may be situated within length L1. In one or more embodiments, passenger bay 128 may be situated along leading edge 102, wherein a longitudinal length of passenger bay may be situated along a length 12 of leading edge 102. In one or more embodiments, passenger bay 128 may be situated along leading edge 102 wherein a longitudinal length of bay aisle 140 may be situated along a length L2 of leading edge 102.

Referring back to FIGS. 1A-C, in one or more embodiments, passenger bay 128 is substantially parallel to at least one leading edge 102 of BWB aircraft. For the purposes of this disclosure, a passenger bay is 'parallel' to at least one leading edge 102 in instances in which one or more components within passenger bay are oriented along the same axis as a portion of leading edge 102. For example, and without limitation, components of passenger bay 129 and a portion of leading edge 102 may be parallel to one another in instances in which components of passenger bay 128 are oriented along axis A-A and a portion of leading edge is oriented along axis A-A as well. In one or more embodiments, components of passenger bay 128 may include but are not limited to, dividers 132, passenger seats, bay aisles 140 passenger rows, passenger columns and/or the like. In one or more embodiments, passenger bay 128 may be parallel to leading 102 wherein passengers seats are facing and/or oriented along the same axis as leading edge 102, bay aisles 140 are situated along the same axis as the leading edge 102 and/or structural elements separating passenger bay 128 from other portions of passenger cabin 120 are situated parallel to and/or along the same axis as at least one leading edge 102. In one or more embodiments, dividers 132 and/or structural elements may contain a length as defined by the portion of dividers and/or structural elements extending along axis A-A and/or axis C-C. In one or more embodiments, dividers 132 and/or structural elements may be parallel to leading edge wherein a length of dividers 132 and/or structural elements may be parallel to a portion of a length L1 of leading edge extending along axis A-A and/or axis C-C. In one or more embodiments, For the purposes of this disclosure, two items are "substantially parallel" in instances in which the two items are parallel or contain a maximum relative angle of 3 degrees. For example, and without limitation, Axis A-A and axis C-C may be substantially parallel wherein a relative angle between axis A-A and axis C-C may contain a maximum angle of 3 degrees. In one or more embodiments, passenger bay 128 may be substantially parallel to leading edge 102 in order to allow for some variation in cabin design. In one or more embodiments, at least one passenger bay 128 may be situated along axis C-C wherein axis C-C may be substantially parallel to axis A-A. In one or more embodiments, passenger bay 128 and/or a portion thereof may be orientated in a direction along axis C-C. In one or more embodiments, passenger seats may be oriented in a direction along axis C-C wherein passengers situated within passenger seats may be facing a direction along axis C-C. In one or more embodiments, bay aisle 140 within passenger bay 128 may be parallel and/or substantially parallel to at least one leading edge 102. In one or more embodiments, bay aisle 140 may be oriented longitudinally along axis C-C wherein axis C-C may be substantially parallel to axis A-A. In one or more embodiments, passenger bay 128 may be substantially parallel to leading edge 102 wherein passenger seats, bay aisle 140, passenger rows and/or dividers 132 may be oriented in a similar direction to that of leading edge 102. In one or more embodiments, passenger rows may be oriented in the same direction as leading edge 102 wherein passenger seats within each passenger row are all facing the same direction as leading edge 102. In one or more embodiments, divider 132 may demarcate at least a portion of perimeter of passenger bay 128. In one or more embodiments, divider 132 may be substantially parallel to leading edge 102. In one or more embodiments, divider 132 may be substantially parallel to leading edge 102 wherein divider 132 may be oriented along axis A-A and/or axis C-C. In one or more embodiments, BWB aircraft 100 may include leading edges 102 on either side of BWB aircraft 100. In one or more embodiments, at least one divider may be substantially parallel to a first leading edge 102 of BWB aircraft. In one or more embodiments, BWB aircraft may include more than one dividers, wherein a first divider of a first passenger bay 128 may be substantially parallel to leading edge 102 and a second and divider of a second passenger bay may be substantially parallel to an opposing leading edge of BWB aircraft 100. In one or more embodiments, more than one passenger bays may be parallel to leading edge 102 of BWB aircraft wherein more than one passenger bays 128 may contain bay aisles 140, passenger seats, passengers rows, dividers 132 and/or the like oriented in a substantially similar direction as leading edge 102. In one or more embodiments, passenger cabin 120 may include a first passenger bay 128 and a second passenger bay. In one or more embodiments, first passenger bay may include a first divider and second passenger bay may include a second divider. In one or more embodiments, first divider of first passenger bay may be substantially parallel to a first leading edge 102 of BWB aircraft and/or second divider of second passenger bay may be substantially parallel to a second leading edge 102 of BWB aircraft. In one or more embodiments, first leading edge 102 may be located on an opposing side of BWB aircraft relative to second leading edge 102. In one or more embodiments, first passenger bay may be nonparallel to second passenger bay. In one or more embodiments, first passenger bay may be non-parallel to second passenger bay wherein bay aisles 140, dividers, passenger seats, passenger rows and/or the like within first passenger bay may be oriented in a differing direction to that of bay aisles 140, passenger seats, passenger rows, divers and/or the like in second passenger bay. In one or more embodiments, A first passenger bay may be oriented in a differing direction in comparison to that of a second passenger bay. In one or more embodiments, more than one passenger bays may be oriented along leading edge 102 of BWB aircraft. In one or more embodiments, more than one or more passenger bays may be laterally adjacent to one another and oriented along leading of BWB aircraft. In one or more embodiments, more than one passenger bays may be laterally adjacent to one another wherein each passenger bay may be oriented along a differing leading edge 102 of BWB aircraft.

With continued reference to FIGS. 1A-C, passenger bay 128 may include one or more and/or a plurality of passenger columns 146. A "passenger column 146" for the purposes of this disclosure refers to more than one passenger seats situated behind one another. In one or more embodiments, passengers seats situated laterally adjacent to one another may be referred to as passenger rows whereas passengers seats situated in front of one another in a longitudinal direction may be referred to as a passenger columns 146. In one or more embodiments, passenger columns 146 may be situated parallel to at least one leading edge 102 wherein passenger seats within passenger column 146 may be situated along axis A-A or C-C. In one or more embodiments, at least one passenger bay may include passenger columns 146 that are situated parallel to leading edge 102 and/or axis A-A. In one or more embodiments, passenger seats within passenger columns 146 may further be oriented in a direction along axis A-A.

With continued reference to FIGS. 1A-C, passenger bays 128 within BWB aircraft 100 may be oriented in non-parallel directions relative to other passenger bays within BWB aircraft 100. For example, and without limitation, a first passenger bay may be situated along a longitudinal axis of BWB aircraft 100, whereas a second passenger bay may be situated 30 degrees away from a longitudinal axis of BWB aircraft. In one or more embodiments, passenger bays may be oriented in differing directions relative to one another wherein a first passenger bay may be situated in a differing direction than that of a second passenger bay. In one or more embodiments, passenger bays may be situated in differing direction wherein passenger seats, bay aisles 140, dividers 132 and/or the like may be situated in differing directions.

With continued reference to FIGS. 1A-C, passenger cabin 120 may include a galley 148. A "galley" as described in this disclosure refers to a portion of aircraft in which foods and/or drinks are prepared for passengers. In one or more embodiments, galleys 148 may be used to store foods and drinks for use during a flight. In one or more embodiments, galley 148 may include a kitchen within passenger cabin 120 used to prepare foods. In one or more embodiments, galley 148 may include cooking appliances such as but not limited to, ovens, stoves microwaves, warmers and/or the like. In one or more embodiments, galley 148 may include refrigerators and/or freezers used to store perishable foods and drinks. In one or more embodiments, galley 148 may include coffee makers, water boilers, and/or the like. In one or more embodiments, carts and/or trolleys may be stored within galley 148 and used during flight to transport foods and drinks throughout passenger cabin 120. In one or more embodiments, galley 148 may include storage compartments configured to store foods and drinks during a flight. In one or more embodiments, galley 148 may include a trash bin and/or trash compacter used to store waste during a flight. In one or more embodiments, galley 148 may include cutlery, utensils, food containers, food trays, beverage containers, ice drawers, ice dispensers, and/or the like. In one or more embodiments, galley 148 may further include seating and rest areas for use by aircraft personnel during a flight.

With continued reference to FIGS. 1A-C, perimeter of passenger bay 128 may be demarcated by at least divider 132. In one or more embodiments, divider 132 may separate passenger bay 128 from galley 148. In one or more embodiments, divider 132 may include a wall and/or any other physical elements that prevent a passenger from directly accessing galley 148 from passenger bay 128. Rather, a passenger may exit passenger bay into cross aisle 136 and enter galley 148 from cross aisle. In one or more embodiments, divider may serve as both a demarcation of a perimeter of galley 148 and a demarcation of a perimeter of passenger bay 128. In one or more embodiments, at least one passenger bay 128 may be located laterally adjacent to galley 148 wherein divider 132 may separate galley 148 from passenger cabin 120.

With continued reference to FIGS. 1A-C, galley 148 may be situated inboard relative to passenger cabin 120. For the purposes of this disclosure, the terms "outboard relative to," and "outboard passenger cabin relative to" refer to a spatial relationship between two items in which a first item is positioned closer to an exterior of the passenger cabin in comparison to a second item. For example, and without limitation, passenger bay 128 may be located outboard passenger cabin, and/or outboard relative to galley 148 wherein passenger bay may be located closer to an exterior or perimeter of passenger cabin in comparison to galley 148. For the purposes of this disclosure, the terms "inboard relative to" and "inboard passenger cabin relative to" refer to a spatial relationship between two items wherein the first item is positioned closer to a centerline of the passenger cabin relative to the second item. For example, and without limitation, galley 148 may be located inboard relative to and/or inboard passenger cabin 120 relative to passenger bay 128 wherein galley 148 may be located closer to a centerline of passenger cabin 120 relative to passenger bay 128. For example, and without limitation, a galley 148 on a tube and wing 116 may be located outboard relative to a centerline of the passenger cabin wherein the galley 148 may be situated closer to the outer edges of BWB aircraft 100 relative to the center. In one or more embodiments, a galley 148 that is located inboard of an aircraft relative to a centerline may include a galley 148 that is situated away from a perimeter of passenger cabin 120. In one or more embodiments, galley 148 may be located inboard passenger cabin 120 relative to a centerline, wherein lavatories, cross aisles 136, bay aisles 140, passenger bays 128 and/or the link may be situated around galley 148. In one or more embodiments, passenger cabin 120 may include a singular galley 148 located inboard of BWB aircraft 100 relative to a centerline. In one or more embodiments, galley 148 may be located fore of one or more one or more passenger bays 128 wherein galley 148 may be located in front of one or more passenger bays 128 relative to a nose portion of BWB aircraft 100. In one or more embodiments, galley 148 may be situated inboard passenger cabin 120 relative to one or more cross aisles 136 wherein galley 148 may be located both fore and aft one or more cross aisles 136. In one or more embodiments, galley 148 may be surrounded by passenger aisles wherein bay aisles 140 and/or cross aisles 136 may surround galley 148.

With continued reference to FIGS. 1A-C, galley 148 may be located and/or situated laterally between one or more passenger bays 128. For example, and without limitation, a first passenger bay 128 may be located starboard relative to BWB aircraft 100 and/or galley 148, and a second passenger bay 128 may be located port relative to BWB aircraft 100 and/or galley 148. In one or more embodiments, galley 148 may be located between two passenger bays 128 wherein a first passenger may be located proximal and/or substantially near a first side of galley 148 and a second passenger bay 128 may be located proximal and/or substantially near a second side of galley 148. In one or more embodiments, galley 148 may be located between two or more passenger bays 128 wherein galley 148 may share a perimeter with one or more passenger bays 128. In one or more embodiments, galley 148 may be located between two or more passenger bays 128, wherein passenger bays 128 may be located fore of galley 148, aft of galley 148, starboard relative to galley 148 and/or port relative to galley 148. In one or more embodiments, galley 148 may be located between two more passenger bays 128 wherein passenger bays 128 may be located outboard of passenger cabin 120 relative to galley 148 and galley 148 may be located inboard of passenger cabin 120 relative to and/or between the passenger bays 128.

With continued reference to FIGS. 1A-C, galley 148 may be located outside of the passenger bays 128. In one or more embodiments, a perimeter defined by each passenger bay 128 may contain passenger seats wherein galley 148 may be located outside of the perimeter defined by the passenger bays 128. In one or more embodiments, galley 148 may be located outside of passenger bays 128 wherein galley 148 may be separated from one or more passenger bays 128 by one or more cross aisles 136. In an embodiment, access to a passenger bay 128 from galley 148 may require the use of a cross aisle 136. In one or more embodiments, galley 148 may be located outside of passenger bays 128 wherein galley 148 may be separated by each passenger bay 128 with a wall, divider 132, structural element, cross aisle 136 and/or the like. In one or more embodiments, access to galley 148 may be done through the use of cross aisles 136 and cannot be accessed directly from one or more passenger bays 128. In one or more embodiments, galley 148 may be located outside of passenger bay 128 wherein a perimeter of galley 148 does not overlap with a perimeter of a passenger bay 128.

With continued reference to FIGS. 1A-C, galley 148 may be linked to one or more cross aisles 136. For example, and without limitation, an aircraft personnel may travel from galley 148 directly to a cross aisle 136. In one or more embodiments, an access route 144 may allow for an aircraft personnel to travel from cross aisle 136 and into galley 148. In one or more embodiments, galley 148 may be situated at or near one or more cross aisles 136 wherein galley 148 may be accessible from one or more cross aisles 136. In one or more embodiments, galley 148 may contain one or more access routes 144 wherein each access route 144 may be linked to one or more cross aisles 136. In one or more embodiments, multiple access routes 144 may be linked to a singular cross aisle 136. In one or more embodiments, galley 148 may contain one or more access routes 144 wherein each access route 144 may allow for access to one or more cross aisles 136. In one or more embodiments, access routes 144 on galley 148 may be located fore and/or aft of galley 148. In one or more embodiments, access routes 144 may include doors, doorways and/or any other structure that allows for aircraft personnel and cargo to travel to and/or from galley 148.

With continued reference to FIGS. 1A-C, galley 148 includes a substantially triangular shape. A "substantially triangular shape" for the purposes of this disclosure refers to an object or structure that contains a perimeter or border having three sides and three vertices similar to that of a triangle yet allows for minor variations. For example, and without limitation, galley 148 may include a substantially triangular shape wherein a perimeter of galley 148 may contain three separate sides and three separate angles yet contain minor variations such as openings at the vertices, rounded edges and/or the like. In one or more embodiments, minor variations may include but are not limited to, rounded edges, vertices with openings to allow passengers to pass through, non-continuous sides which may be used as openings to pass through and/or the like. In one or more embodiments, an object having a substantially triangular shape may contain three distinct sides and three angles or vertices. In one or more embodiments, a sum of all angles in substantially triangular shape may be 180 degrees. In one or more embodiments, substantially triangular shape may contain sides with curvature, rounded vertices and/or the like. In one or more embodiments, galley 148 may include substantially triangular shape wherein galley 148 may take the form of a triangle while still allowing for some minor variations. In one or more embodiments, galley 148 may include a substantially triangular shape, wherein galley 148 may include three vertices similar to that of a triangle. In one or more embodiments, galley 148 may include a substantially triangular shape wherein a perimeter of galley 148 may resemble a triangle. In one or more embodiments, galley 148 may include a substantially triangular shape wherein galley 148 may contain three sides and three vertices similar to that of a triangle. In one or more embodiments, galley 148 may include a substantially triangular shape, wherein a surface area of a floor of galley 148 may resemble a triangle. In one or more embodiments, a perimeter of galley 148 may resemble a triangle, while the interior of galley 148 may take the form of another shape due to the addition of compartments, storage and/or other items needed within galley 148. In one or more embodiments, galley 148 may include one or more vertices. A "vertex" or "vertices" for the purposes of this disclosure refers to a point at which two or more lines or edges meet. In one or more embodiments, galley 148 may contain three vertices similar to that of a triangle. In one or more embodiments, a perimeter of galley 148 may contain vertices similar that of a triangle. In one or more embodiments, vertices of galley 148 may contain access routes 144 wherein aircraft personnel may access galley 148 through access routes 144 located at vertices. In one or more embodiments, galley 148 may include one or more access routes 144 located at one or more vertices of substantially triangular shape. In one or more embodiments, aircraft personnel may travel into and out of galley 148 through one or more access routes 144 located at vertices of substantially triangular shape. In one or more embodiments, access routes 144 may be situated proximal to one or more vertices wherein access routes 144 may be situated closer to an access route 144 in comparison to a halfway point between two vertices. In one or more embodiments, access routes 144 may be located one or more sides of substantially triangular shape. In one or more embodiments, galley 148 may allow for access to one or more passenger bays 128 through the use of cross aisles 136. In one or more embodiments, galley 148 may contain one or more access routes 144 wherein each access route 144 may be linked to one or more passenger bays 128 and/or cross aisles 136. In one or more embodiments, galley 148 may be separated between any passenger bay 128 of a plurality of passenger bays 128 on BWB aircraft 100 by a maximum of one cross aisle 136. For example, and without limitation, an aircraft personnel may exit galley 148 and travel to any passenger bay 128 within passenger cabin 120 using a maximum of one cross aisle 136. In one or more embodiments, galley 148 may be central to passenger cabin 120 wherein any passenger bay 128 may be distanced a maximum of one cross aisle 136 from galley 148. In one or more embodiments, galley 148 may be located central to one or more passenger bays 128 within passenger cabin 120 wherein an aircraft personnel do not need to travel through a passenger bay 128 in order to access another passenger bay 128. For the purposes of this disclosure, a galley 148 may be referred to as 'central' to one or more passengers bays in instances in which one or more passengers bays 128 may be accessed by traversing only one cross aisle 136 from galley 148. In one or more embodiments, as opposed to tube and wing aircraft in which a maximum of two passenger aisles may be used to access multiple passenger seats, BWB aircraft 100 may contain more than a plurality of passenger aisles wherein aircraft personnel may utilize any of the plurality of passenger aisles to access one or more passenger seats and/or passenger bays 128. In one or more embodiments, at least one access route 144 of triangular galley 148 may be linked to at least one cross aisle 136. In one or more embodiments, at least one access route 144 of triangular galley 148 may be linked to at least one cross aisle 136 wherein an aircraft personnel may travel through access route 144 in order to access cross aisle 136. In one or more embodiments, galley 148 may include one or more access routes 144 wherein each access route 144 is linked to at least one cross aisle 136.

With continued reference to FIGS. 1A-C, galley 148 may be surrounded by passenger bays 128. In one or more embodiments, galley 148 may be surrounded by one or more passenger bays 128 wherein a passenger bay 128 may be located proximal to each side of the substantially triangular shape. For the purposes of the disclosure, the term "surrounded" used with respect to galley 148 refers to galley being located inboard passenger cabin 120 relative to one or more passenger bays 128 within passenger cabin 120. For example, and without limitation, at least one passenger bay may be located outboard relative to each side of galley 148. In one or more embodiments, galley 148 may include three sides similar to that of a triangle wherein at least one passenger bay 128 may be located outboard relative to side of galley 148. In one or more embodiments, galley 148 may be surrounded by one or more passenger bays 128 wherein each side of galley 148 may share a border with a passenger bay 128 and/or each side of galley 148 may share a border with a cross aisle 136, wherein the cross aisle 136 shares a border with one or more passenger bays 128. In one or more embodiments, galley 148 may be surrounded by passenger bays 128 wherein passenger bays 128 may substantially encircle a perimeter of galley 148. In one or more embodiments, galley 148 may be surrounded by passenger bays 128 wherein a passenger bay 128 may be located fore of passenger bay 128 relative to aircraft, aft of passenger bay 128 relative to aircraft, starboard of passenger bay 128 relative to BWB aircraft 100 and/or port of passenger bay 128 relative to aircraft. In one or more embodiments, galley 148 may be surrounded by more than one passenger bays 128 wherein galley 148 may be located inboard relative to passenger bays 128, and one or more passenger bays 128 may be located outboard relative to galley 148.

With continued reference to FIGS. 1A-C, galley 148 may include a substantially isosceles triangular shape. A "substantially isosceles triangular shape" for the purposes of this disclosure refers to an object or structure that contains a perimeter or border having three sides and three vertices similar to that of an isosceles triangle yet allows for minor variations. In one or more embodiments, galley 148 may resemble an isosceles triangle wherein one or two or more sides contain substantially similar lengths. In one or more embodiments, galley 148 May resemble a substantially isosceles triangle wherein two or more vertices of galley 148 share substantially similar angles. In one or more embodiments, galley 148 may contain a substantially isosceles triangular shape wherein a perimeter of galley 148 may resemble an isosceles triangle. In one or more embodiments, galley 148 may resemble an isosceles triangle wherein two borders of galley 148 may be similar in length. In one or more embodiments, a substantially isosceles triangular shape may allow for minor deviations, such as for example, openings at the vertices to allow aircraft personnel to pass through, non-continuous sides that may act as access routes, curved edges at the vertices and/or the like. In one or more embodiments, an object having a substantially isosceles triangle may contain at least two sides having substantially similar lengths with a maximum 10% deviation. In one or more embodiments, a substantially isosceles triangle may contain at least two vertices having substantially similar angles with a maximum of 10% deviation between the two angle.

With continued reference to FIGS. 1A-C, galley 148 may contain one or more borders configured to separate galley 148 from one or more portions of passenger cabin 120. A "border" for the purposes of this disclosure is a component used to indicate a separation between galley 148 and other portions of passenger cabin 120. In one or more embodiments, borders may be consistent with dividers 132. In one or more embodiments, borders may include walls, dividers 132, structural elements and the like. In one or more embodiments, borders may include windows which may allow aircraft personnel and passengers to peer through the windows and into or out of galley 148. In one or more embodiments, borders of galley 148 may resemble the shape of a triangle and/or isosceles triangle. In one or more embodiments, borders of galley 148 may serve both as structural components to contain BWB aircraft 100 and as separations between galley 148 and passenger bays 128 and/or other portions of BWB aircraft 100. In one or more embodiments, borders may include walls and/to structural elements surrounding galley 148. In one or more embodiments, galley 148 may be separated from other portions of passenger cabin 120 and/or passenger bays 128 through the use of borders. In one or more embodiments, galley 148 may share a border between galley 148 and a passenger cabin 120.

With continued reference to FIGS. 1A-C, in one or more embodiments, galley 148 may include crew seats. "Crew seats" for the purposes of this disclosure refers to seats within passenger cabin that are configured for use by aircraft personnel. In one or more embodiments, during takeoff and/or landing, aircraft personnel may sit in crew seats and strap themselves in for safety. In one or more embodiments, crew seats may allow aircraft personnel to quickly strap themselves in during emergencies. In one or more embodiments, aircraft personnel may be seated within galley 148 during a flight. In one or more embodiments, crew seats may be situated substantially adjacent to border of galley 148. In one or more embodiments, crew seats may be situated near a perimeter of galley 148.

Figure 2:
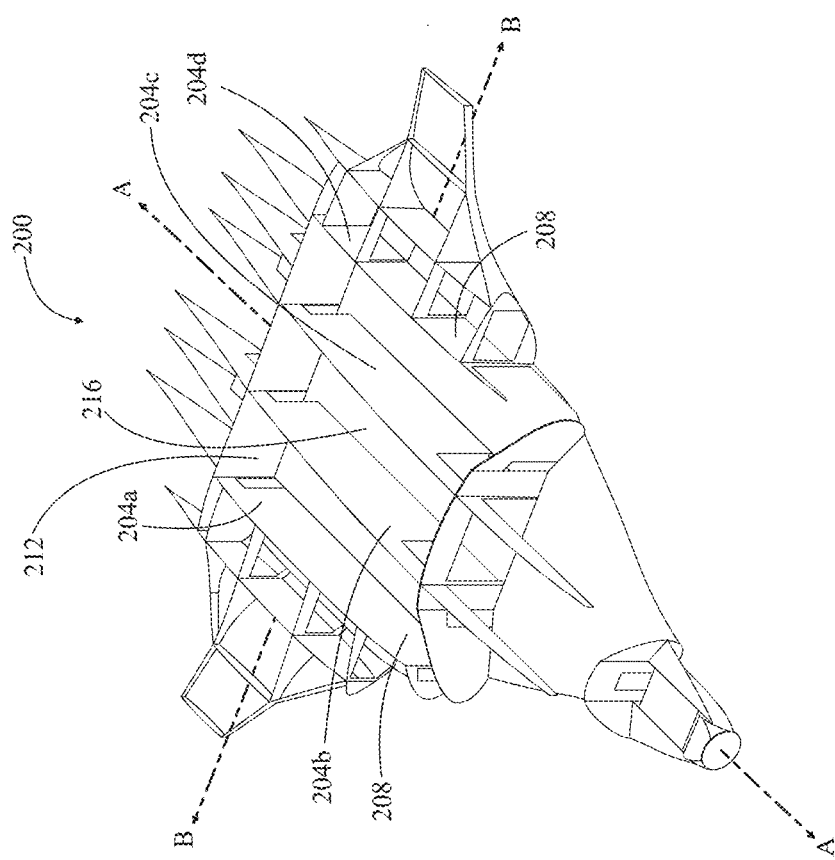
FIG. 2 is an illustration depicting an exemplary embodiment of the blended wing body aircraft, not including an upper skin of the blended wing body aircraft.

Now referring to FIG. 2, an exemplary embodiment of BWB aircraft 200, without skin, is shown in accordance with one or more embodiments. In one or more embodiments, BWB aircraft 200 may include an interior structural element of BWB aircraft 200. In one or more embodiments, interior structural element may include structural element as described above. Interior structural elements may provide physical stability during an entirety of an aircraft's 100 flight envelope, while on ground, and during normal operation. In non-limiting examples, interior structural elements may include struts, beams, formers, stringers, longerons, interstitials, ribs, structural skin, doublers, straps, spars, panels, pillars, and the like. In one or more embodiments, for the purpose of aircraft cockpits comprising windows/windshields, pillars may include vertical or near vertical supports around a window configured to provide extra stability around weak points in a vehicle's structure, such as an opening where a window is installed. Where multiple pillars are disposed in BWB aircraft 200's structure, they may be so named A, B, C, and so on named from nose to tail. Pillars may be disposed a distance away from each other, along an exterior of BWB aircraft 200. Depending on manufacturing method of BWB aircraft, pillars may be integral to frame and skin, comprised entirely of internal framing, or alternatively, may be only integral to structural skin elements.

Still referring to FIG. 2, and in one or more embodiments of the present disclosure, structural elements of BWB aircraft 200 may include one or more longitudinal walls 204, which may run substantially and/or approximately parallel to a longitudinal axis A of BWB aircraft 200. For example, and without limitation, structural elements may include a plurality of walls 204. Plurality of walls 204 may include one or more walls, such as walls 204a-d. Each longitudinal wall 204a-d may extend from a top side of BWB aircraft 200 to a bottom side of BWB aircraft 200. In one or more embodiments, plurality of wall 204 may include at least a laterally outermost bulkhead 208 configured to resist cabin pressure. As used herein, a "laterally outermost bulkhead" is the last lateral pressure containing component of an airframe. The laterally outermost bulkhead may include the last bulkhead on a right side or a left side of an airframe. In one or more embodiments, BWB aircraft 200 may include an aft pressure bulkhead 212, located aft of a cabin. Aft pressure bulkhead 212 may resist pressure loading between the atmosphere and the cabin at the aft of BWB aircraft 200. As used herein, an "aft pressure bulkhead" is a rear pressure containing component an airframe. Aft pressure bulkhead 212 may intersect one or more walls 204a-d. Aft pressure bulkhead 212 may be oriented substantially and/or approximately orthogonal to walls 204a-d. For example, and without limitation, aft pressure bulkhead may be positioned parallel to a lateral axis B of BWB aircraft 200. In one or more embodiments, aft pressure bulkhead 212 may attach with skin at a top and bottom edge of aft pressure bulkhead 212.

Still referring to FIG. 2, BWB aircraft 200 may include a base 216, which extends over longitudinal axis A and lateral axis B of BWB aircraft 200. In one or more embodiments, structural components, such as, for example, longitudinal walls 204 may be attached to base 216. In one or more embodiments, structural components, such as, for example, walls 204, may traverse through base 216. For instance, and without limitation, base 216 may include an upper surface and a lower surface, where plurality of walls 204 are attached at one or more of upper surface of base 216 and lower surface of base 216. For the purposes of this disclosure, a "base" is a planar structural component that includes a platform, such as an integrated floor, which one or more other structural components may be mounted and/or attached to. For example, and without limitation, plurality of longitudinal walls 204a-d may run lengthwise along base 216 and extend from base 216 toward skin of aircraft, compartmentalizing cabin of fuselage into distinct compartments running longitudinally. In various embodiments, walls 204a-d may each be attached to a top surface of base 216 and extend toward skin. In various embodiments, base 216 may include supports, such as, for example, floor beams, that upper surface and/or lower surface may be attached to. In a nonlimiting embodiment, base 216 may include supports such as lateral floor beams and/or longitudinal stringers that each wall 204 may attach to. In one or more embodiments, one or more walls 204a-d may traverse through base 216 and extend from a bottom surface of base 216 to attach to an underside (e.g., bottom) of skin to provide additional support to BWB aircraft 200. In one or more embodiments, two outermost (laterally) longitudinal ribs, such as walls 204a and 204d, may include pressure bulkheads, where a pressure bulkhead resists a pressure loading resulting from low ambient pressure and internal cabin pressure. Each longitudinal wall 204a-d may provide structural support for BWB aircraft 200. For instance, and without limitation, longitudinal walls 204a-d may provide resistance against wing bend moments, support of payload, resistance against skin buckling, resistance to loadings from air pressure, resistance to shear, tensile, and compression forces, and the like.

Still referring to FIG. 2, in one or more embodiments, BWB aircraft 200 may include lateral aisle 220 and/or passenger door 224. BWB aircraft 200 may further include a second passenger door mirroring passenger door 224 on an opposite lateral side of BWB aircraft 200. Lateral aisle 220 may run from passenger door 224 to such a second passenger door.

Figure 3:
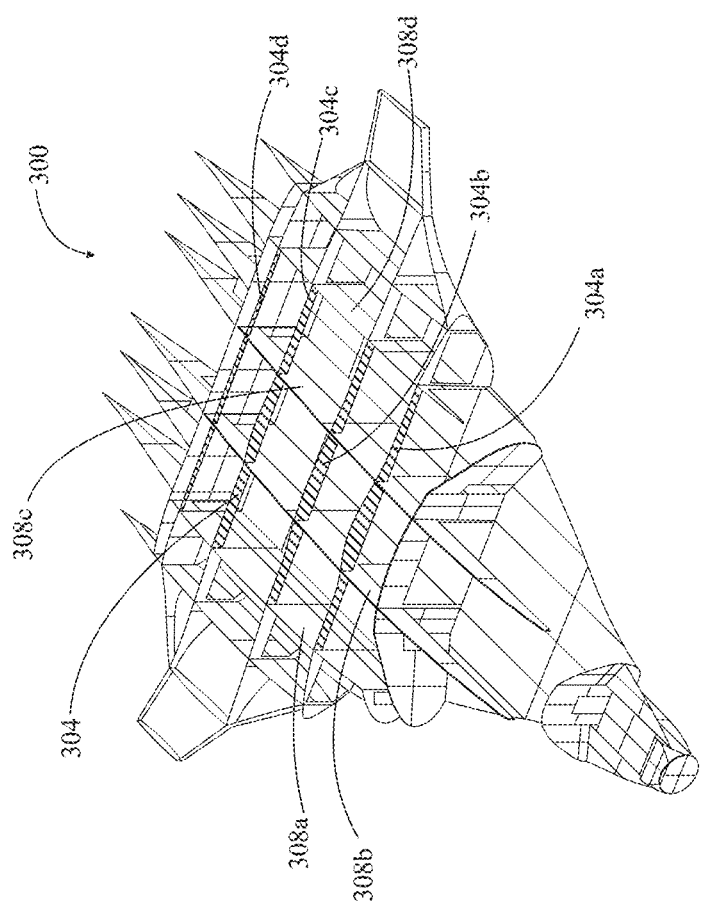
FIG. 3 is a schematic diagram showing a top, front, and left perspective view of an exemplary blended wing body aircraft, depicting exemplary structural elements.

Now referring to FIG. 3, in one or more embodiments, a structural element includes a deep ceiling beam. In one or more embodiments, a ceiling and/or an upper skin of an aircraft is supported by one or more deep ceiling beams. Deep ceiling beams may include, in non-limiting embodiments, longitudinal deep ceiling beams and/or lateral deep ceiling beams 304. In one or more embodiments, deep ceiling beams may be positioned above another structural element such as a wall. In one or more embodiments, deep ceiling beams may be positioned on a section of an aircraft ceiling that does not include, or is not immediately connected to, another structural element. As non-limiting examples, a deep ceiling beam may be positioned above an aisle or a seat. In one or more embodiments, a deep ceiling beam may run the entire length of a pressure vessel. In one or more embodiments, a deep ceiling beam may connect to opposite walls of a pressure vessel. In one or more embodiments, a deep ceiling beam may be straight. In one or more embodiments, BWB aircraft 300 may include a plurality of parallel deep ceiling beams. In one or more embodiments, BWB aircraft 300 may include 2, 3, 4, 5, 6, 7, 8, 9, 10, 15, 20, or more parallel deep ceiling beams.

Still referring to FIG. 3, in a non-limiting example, structural element may include one or more beams 304a-d that at least partially extend between one or more walls 308a-d. For example, and without limitation, each beam 304a-d may traverse laterally across walls 308. Beams 304a-d may extend substantially and/or approximately parallel to lateral axis B. Each beam 304a-d may include a monolithic component that extends laterally across fuselage. Each beam 304a-d may be attached to one or more walls 308 and/or an outer skin of the aircraft. For example, and without limitation, an edge of beam 304 may abut and/or be adjoined to an interior surface skin of BWB aircraft 300 that may define, for example, a cabin.

In the following description, for the purposes of explanation, numerous specific details are set forth in order to provide a thorough understanding of the present invention. For purposes of description herein, relating terms, including "upper," "lower," "left", "rear", "right", "front", "vertical", "horizontal", and derivatives thereof relate to embodiments oriented as shown for exemplary purposes in FIG. 4. Furthermore, there is no intention to be bound by any expressed or implied theory presented in this disclosure.

Figure 4:
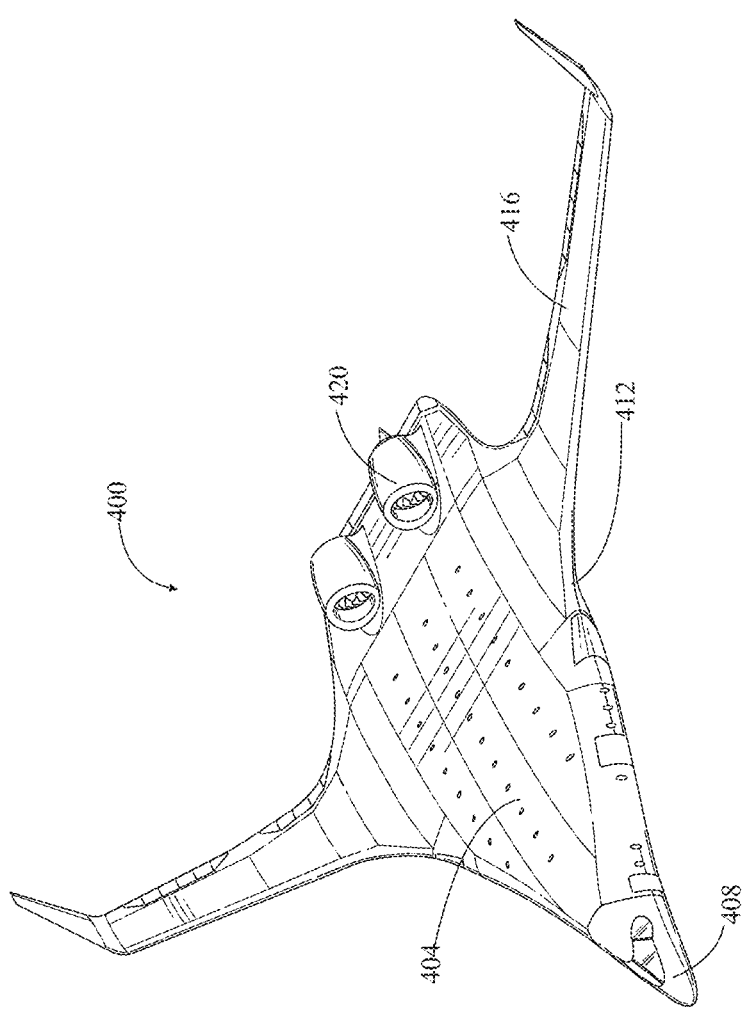
FIG. 4 is a schematic of an exemplary blended wing aircraft.

Referring to FIG. 4, an exemplary blended wing aircraft 400 is illustrated. Aircraft 400 may include a blended wing body 404. For the purposes of this disclosure, a "blended wing body aircraft" is an aircraft having a blended wing body. As used in this disclosure, A "blended wing body" (BWB), also known as a "blended body" or a "hybrid wing body" (HWB), is a fixed-wing aircraft body having no clear or abrupt demarcation between wings and a main body of the aircraft along a leading edge of the aircraft. For example, a BWB 404 aircraft may have distinct wing and body structures, which are smoothly blended together with no clear dividing line or boundary feature between wing and fuselage. This contrasts with a flying wing, which has no distinct fuselage, and a lifting body, which has no distinct wings. A BWB 404 design may or may not be tailless. One potential advantage of a BWB 404 may be to reduce wetted area and any accompanying drag associated with a conventional wing-body junction. In one or more embodiments, a BWB 404 may also have a wide airfoil-shaped body, allowing entire aircraft to generate lift and thereby facilitate reduction in size and/or drag of wings. In one or more embodiments, a BWB 404 may be understood as a hybrid shape that resembles a flying wing, but also incorporates features from conventional aircraft. In one or more embodiments, this combination may offer several advantages over conventional tube-and-wing airframes. In one or more embodiments, a BWB 404 airframe may help to increase fuel economy and create larger payload (cargo or passenger) volumes within the BWB. BWB 404 may allow for advantageous interior designs. For instance, cargo can be loaded and/or passengers can board from the front or rear of the aircraft. A cargo or passenger area may be distributed across a relatively wide (when compared to conventional tube-wing aircraft) fuselage, providing a large usable volume. In one or more embodiments, passengers seated within an interior of aircraft, real-time video at every seat can take place of window seats.

With continued reference to FIG. 4, BWB 404 of aircraft 400 may include a nose portion. A "nose portion," for the purposes of this disclosure, refers to any portion of aircraft 400 forward of the aircraft's fuselage. Nose portion may comprise a cockpit (for manned aircraft), canopy, aerodynamic fairings, windshield, and/or any structural elements required to support mechanical loads. Nose portion may also include pilot seats, control interfaces, gages, displays, inceptor sticks, throttle controls, collective pitch controls, and/or communication equipment, to name a few. Nose portion may comprise a swing nose configuration. A swing nose may be characterized by an ability of the nose to move, manually or automatedly, into a differing orientation than its flight orientation to provide an opening for loading a payload into aircraft fuselage from the front of the aircraft. Nose portion may be configured to open in a plurality of orientations and directions.

With continued reference to FIG. 4, BWB 404 may include at least a structural component of aircraft 400. Structural components may provide physical stability during an entirety of an aircraft's 400 flight envelope, while on ground, and during normal operation Structural components may comprise struts, beams, formers, stringers, longerons, interstitials, ribs, structural skin, doublers, straps, spars, or panels, to name a few. Structural components may also comprise pillars. In one or more embodiments, for the purpose of aircraft cockpits comprising windows/windshields, pillars may include vertical or near vertical supports around a window configured to provide extra stability around weak points in a vehicle's structure, such as an opening where a window is installed. Where multiple pillars are disposed in an aircraft's 400 structure, they may be so named A, B, C, and so on named from nose to tail. Pillars, like any structural element, may be disposed a distance away from each other, along an exterior of aircraft 400 and BWB 404. Depending on manufacturing method of BWB 404, pillars may be integral to frame and skin, comprised entirely of internal framing, or alternatively, may be only integral to structural skin elements. Structural skin will be discussed in greater detail below.

With continued reference to FIG. 4, BWB 404 may include a plurality of materials, alone or in combination, in its construction. At least a BWB 404, in an illustrative embodiment may include a welded steel tube frame further configured to form a general shape of a nose corresponding to an arrangement of steel tubes. Steel may include any of a plurality of alloyed metals, including but not limited to, a varying amount of manganese, nickel, copper, molybdenum, silicon, and/or aluminum, to name a few. Welded steel tubes may be covered in any of a plurality of materials suitable for aircraft skin. Some of these may include carbon fiber, fiberglass panels, cloth-like materials, aluminum sheeting, or the like. BWB 404 may comprise aluminum tubing mechanically coupled in various orientations. Mechanical fastening of aluminum members (whether pure aluminum or alloys) may comprise temporary or permanent mechanical fasteners appreciable by one of ordinary skill in the art including, but not limited to, screws, nuts and bolts, anchors, clips, welding, brazing, crimping, nails, blind rivets, pull-through rivets, pins, dowels, snap-fits, clamps, and the like. BWB 404 may additionally or alternatively use wood or another suitably strong yet light material for an internal structure.

With continued reference to FIG. 4, aircraft 400 may include monocoque or semi-monocoque construction. BWB 404 may include carbon fiber. Carbon fiber may include carbon fiber reinforced polymer, carbon fiber reinforced plastic, or carbon fiber reinforced thermoplastic (e.g., CFRP, CRP, CFRTP, carbon composite, or just carbon, depending on industry). "Carbon fiber," as used in this disclosure, is a composite material including a polymer reinforced with carbon. In general, carbon fiber composites consist of two parts, a matrix and a reinforcement. In carbon fiber reinforced plastic, the carbon fiber constitutes the reinforcement, which provides strength. The matrix can include a polymer resin, such as epoxy, to bind reinforcements together. Such reinforcement achieves an increase in CFRP's strength and rigidity, measured by stress and elastic modulus, respectively. In embodiments, carbon fibers themselves can each comprise a diameter between 5-10 micrometers and include a high percentage (i.e., above 85%) of carbon atoms. A person of ordinary skill in the art will appreciate that the advantages of carbon fibers include high stiffness, high tensile strength, low weight, high chemical resistance, high temperature tolerance, and low thermal expansion. According to embodiments, carbon fibers may be combined with other materials to form a composite, when permeated with plastic resin and baked, carbon fiber reinforced polymer becomes extremely rigid. Rigidity may be considered analogous to stiffness which may be measured using Young's Modulus. Rigidity may be defined as a force necessary to bend and/or flex a material and/or structure to a given degree. For example, ceramics have high rigidity, which can be visualized by shattering before bending. In embodiments, carbon fibers may additionally, or alternatively, be composited with other materials like graphite to form reinforced carbon-carbon composites, which include high heat tolerances over 2000° C. A person of skill in the art will further appreciate that aerospace applications may require high-strength, low-weight, high heat resistance materials in a plurality of roles, such as without limitation fuselages, fairings, control surfaces, and structures, among others.

With continued reference to FIG. 4, BWB 404 may include at least a fuselage. A "fuselage," for the purposes of this disclosure, refers to a main body of an aircraft 400, or in other words, an entirety of the aircraft 400 except for nose, wings, empennage, nacelles, and control surfaces. In one or more embodiments, fuselage may contains an aircraft's payload. At least a fuselage may comprise structural components that physically support a shape and structure of an aircraft 400. Structural components may take a plurality of forms, alone or in combination with other types. Structural components vary depending on construction type of aircraft 400 and specifically, fuselage. A fuselage 412 may include a truss structure. A truss structure may be used with a lightweight aircraft. A truss structure may include welded steel tube trusses. A "truss," as used in this disclosure, is an assembly of beams that create a rigid structure, for example without limitation including combinations of triangles to create three-dimensional shapes. A truss structure may include wood construction in place of steel tubes, or a combination thereof. In one or more embodiments, structural components can comprise steel tubes and/or wood beams. An aircraft skin may be layered over a body shape constructed by trusses. Aircraft skin may comprise a plurality of materials such as plywood sheets, aluminum, fiberglass, and/or carbon fiber.

With continued reference to FIG. 4, in embodiments, at least a fuselage may comprise geodesic construction. Geodesic structural elements may include stringers wound about formers (which may be alternatively called station frames) in opposing spiral directions. A "stringer," for the purposes of this disclosure is a general structural element that includes a long, thin, and rigid strip of metal or wood that is mechanically coupled to and spans the distance from, station frame to station frame to create an internal skeleton on which to mechanically couple aircraft skin. A former (or station frame) can include a rigid structural element that is disposed along a length of an interior of a fuselage orthogonal to a longitudinal (nose to tail) axis of aircraft 400. In one or more embodiments, a former forms a general shape of at least a fuselage. A former may include differing cross-sectional shapes at differing locations along a fuselage, as the former is a structural component that informs an overall shape of the fuselage. In embodiments, aircraft skin can be anchored to formers and strings such that an outer mold line of volume encapsulated by the formers and stringers comprises a same shape as aircraft 400 when installed. In other words, former(s) may form a fuselage's ribs, and stringers may form interstitials between the ribs. A spiral orientation of stringers about formers may provide uniform robustness at any point on an aircraft fuselage such that if a portion sustains damage, another portion may remain largely unaffected. Aircraft skin may be mechanically coupled to underlying stringers and formers and may interact with a fluid, such as air, to generate lift and perform maneuvers.

With continued reference to FIG. 4, according to some embodiments, a fuselage can comprise monocoque construction. Monocoque construction can include a primary structure that forms a shell (or skin in an aircraft's case) and supports physical loads. Monocoque fuselages are fuselages in which the aircraft skin or shell may also include a primary structure. In monocoque construction aircraft skin would support tensile and compressive loads within itself and true monocoque aircraft can be further characterized by an absence of internal structural elements. Aircraft skin in this construction method may be rigid and can sustain its shape with substantially no structural assistance form underlying skeleton-like elements. Monocoque fuselage may include aircraft skin made from plywood layered in varying grain directions, epoxy-impregnated fiberglass, carbon fiber, or any combination thereof.

With continued reference to FIG. 4, according to some embodiments, a fuselage may include a semi-monocoque construction. Semi-monocoque construction, as used in this disclosure, is used interchangeably with partially monocoque construction, discussed above. In semi-monocoque construction, a fuselage may derive some structural support from stressed aircraft skin and some structural support from underlying frame structure made of structural components. Formers or station frames can be seen running transverse to a long axis of fuselage with circular cutouts which may be used in real-world manufacturing for weight savings and for routing of electrical harnesses and other modern on-board systems. In a semi-monocoque construction, stringers may be thin, long strips of material that run parallel to a fuselage's long axis. Stringers can be mechanically coupled to formers permanently, such as with rivets. Aircraft skin can be mechanically coupled to stringers and formers permanently, such as by rivets as well. A person of ordinary skill in the art will appreciate that there are numerous methods for mechanical fastening of the aforementioned components like screws, nails, dowels, pins, anchors, adhesives like glue or epoxy, or bolts and nuts, to name a few. According to some embodiments, a subset of semi-monocoque construction may be unibody construction. Unibody, which is short for "unitized body" or alternatively "unitary construction," vehicles are characterized by a construction in which body, floor plan, and chassis form a single structure, for example an automobile. In the aircraft world, a unibody may include internal structural elements, like formers and stringers, constructed in one piece, integral to an aircraft skin. In one or more embodiments, stringers and formers may account for a bulk of any aircraft structure (excluding monocoque construction). Stringers and formers can be arranged in a plurality of orientations depending on aircraft operation and materials. Stringers may be arranged to carry axial (tensile or compressive), shear, bending or torsion forces throughout their overall structure. Due to their coupling to aircraft skin, aerodynamic forces exerted on aircraft skin may be transferred to stringers. Location of said stringers greatly informs type of forces and loads applied to each and every stringer, all of which may be accounted for through design processes including, material selection, cross-sectional area, and mechanical coupling methods of each member. Similar methods may be performed for former assessment and design. In general, formers may be significantly larger in cross-sectional area and thickness, depending on location, than stringers. Both stringers and formers may comprise aluminum, aluminum alloys, graphite epoxy composite, steel alloys, titanium, or an undisclosed material alone or in combination.

With continued reference to FIG. 4, in one or more embodiments, a primary purpose for a substructure of a semi-monocoque structure is to stabilize a skin. Typically, aircraft structure is required to have a very light weight and as a result, in one or more embodiments, aircraft skin may be very thin. In one or more embodiments, unless supported, this thin skin structure may tend to buckle and/or cripple under compressive and/or shear loads. In one or more embodiments, underlying structure may be primarily configured to stabilize skins. For example, in an exemplary conventional airliner, wing structure is an airfoil-shaped box with truncated nose and aft triangle; without stabilizing substructure, in one or more embodiments, this box would buckle upper skin of the wing and the upper skin would also collapse into the lower skin under bending loads. In one or more embodiments, deformations are prevented with ribs that support stringers which stabilize the skin. Fuselages are similar with bulkheads or frames, and stringers.

With continued reference to FIG. 4, in one or more embodiments, another common structural form is sandwich structure. As used in this disclosure, "sandwich structure" includes a skin structure having an inner and outer skin separated and stabilized by a core material. In one or more embodiments, sandwich structure may additionally include some number of ribs or frames. In one or more embodiments, sandwich structure may include metal, polymer, and/or composite. In one or more embodiments, core material may include honeycomb, foam plastic, and/or end-grain balsa wood. In one or more embodiments, sandwich structure can be popular on composite light airplanes, such as gliders and powered light planes. In one or more embodiments, sandwich structure may not use stringers, and sandwich structure may allow number of ribs or frames to be reduced, for instance in comparison with a semi-monocoque structure. In one or more embodiments, sandwich structure may be suitable for smaller, possibly unmanned, unpressurized blended wing body aircraft.

With continued reference to FIG. 4, stressed skin, when used in semi-monocoque construction, may bear partial, yet significant, load. In other words, an internal structure, whether it be a frame of welded tubes, formers and stringers, or some combination, is not sufficiently strong enough by design to bear all loads. The concept of stressed skin is applied in monocoque and semi-monocoque construction methods of at least a fuselage and/or BWB 404. In one or more embodiments, monocoque may be considered to include substantially only structural skin, and in that sense, aircraft skin undergoes stress by applied aerodynamic fluids imparted by fluid. Stress as used in continuum mechanics can be described in pound-force per square inch ($lbf/in^2$) or Pascals (Pa). In semi-monocoque construction stressed skin bears part of aerodynamic loads and additionally imparts force on an underlying structure of stringers and formers.

With continued reference to FIG. 4, a fuselage may include an interior cavity. An interior cavity may include a volumetric space configurable to house passenger seats and/or cargo. An interior cavity may be configured to include receptacles for fuel tanks, batteries, fuel cells, or other energy sources as described herein. In one or more embodiments, a post may be supporting a floor (i.e., deck), or in other words a surface on which a passenger, operator, passenger, payload, or other object would rest on due to gravity when within an aircraft 400 is in its level flight orientation or sitting on ground. A post may act similarly to stringer in that it is configured to support axial loads in compression due to a load being applied parallel to its axis due to, for example, a heavy object being placed on a floor of aircraft 400. A beam may be disposed in or on any portion a fuselage that requires additional bracing, specifically when disposed transverse to another structural element, like a post, which would benefit from support in that direction, opposing applied force. A beam may be disposed in a plurality of locations and orientations within a fuselage as necessitated by operational and constructional requirements.

With continued reference to FIG. 4, aircraft 400 may include at least a flight component 416. A flight component 416 may be consistent with any description of a flight component described in this disclosure, such as without limitation propulsors, control surfaces, rotors, paddle wheels, engines, propellers, wings, winglets, or the like. For the purposes of this disclosure, at least a "flight component" is at least one element of an aircraft 400 configured to manipulate a fluid medium such as air to propel, control, or maneuver an aircraft. In nonlimiting examples, at least a flight component may include a rotor mechanically connected to a rotor shaft of an electric motor further mechanically affixed to at least a portion of aircraft 400. In one or more embodiments, at least a flight component 416 may include a propulsor, for example a rotor attached to an electric motor configured to produce shaft torque and in turn, create thrust. As used in this disclosure, an "electric motor" is an electrical machine that converts electric energy into mechanical work.

With continued reference to FIG. 4, for the purposes of this disclosure, "torque", is a twisting force that tends to cause rotation. Torque may be considered an effort and a rotational analogue to linear force. A magnitude of torque of a rigid body may depend on three quantities: a force applied, a lever arm vector connecting a point about which the torque is being measured to a point of force application, and an angle between the force and the lever arm vector. A force applied perpendicularly to a lever multiplied by its distance from the lever's fulcrum (the length of the lever arm) is its torque. A force of three newtons applied two meters from the fulcrum, for example, exerts the same torque as a force of one newton applied six meters from the fulcrum. In one or more embodiments, direction of a torque can be determined by using a right-hand grip rule which states: if fingers of right hand are curled from a direction of lever arm to direction of force, then thumb points in a direction of the torque. One of ordinary skill in the art would appreciate that torque may be represented as a vector, consistent with this disclosure, and therefore may include a magnitude and a direction. "Torque" and "moment" are used interchangeably within this disclosure. Any torque command or signal within this disclosure may include at least the steady state torque to achieve the torque output to at least a propulsor.

With continued reference to FIG. 4, at least a flight component may be one or more devices configured to affect aircraft's 400 attitude. "Attitude," for the purposes of this disclosure, is the relative orientation of a body, in this case aircraft 400, as compared to earth's surface or any other reference point and/or coordinate system. In one or more embodiments, attitude may be displayed to pilots, personnel, remote users, or one or more computing devices in an attitude indicator, such as without limitation a visual representation of a horizon and its relative orientation to aircraft 400. A plurality of attitude datums may indicate one or more measurements relative to an aircraft's pitch, roll, yaw, or throttle compared to a relative starting point. One or more sensors may measure or detect an aircraft's 400 attitude and establish one or more attitude datums. An "attitude datum," for the purposes of this disclosure, refers to at least an element of data identifying an attitude of an aircraft 400.

With continued reference to FIG. 4, in one or more embodiments, aircraft 400 may include one or more of an angle of attack sensor and a yaw sensor. In one or more embodiments, one or more of an angle of attack sensor and a yaw sensor may include a vane (e.g., wind vane). In one or more embodiments, vane may include a protrusion on a pivot with an aft tail. The protrusion may be configured to rotate about pivot to maintain zero tail angle of attack. In one or more embodiments, pivot may turn an electronic device that reports one or more of angle of attack and/or yaw, depending on, for example, orientation of the pivot and tail. Alternatively or additionally, in one or more embodiments, one or more of angle of attack sensor and/or yaw sensor may include a plurality of pressure ports located in selected locations, with pressure sensors located at each pressure port. In one or more embodiments, differential pressure between pressure ports can be used to estimate angle of attack and/or yaw.

With continued reference to FIG. 4, in one or more embodiments, aircraft 400 may include at least a pilot control. As used in this disclosure, a "pilot control," is an interface device that allows an operator, human or machine, to control a flight component of an aircraft. Pilot control may be communicatively connected to any other component presented in aircraft 400, the communicative connection may include redundant connections configured to safeguard against single-point failure. In one or more embodiments, a plurality of attitude datums may indicate a pilot's instruction to change heading and/or trim of an aircraft 400. Pilot input may indicate a pilot's instruction to change an aircraft's pitch, roll, yaw, throttle, and/or any combination thereof. Aircraft trajectory may be manipulated by one or more control surfaces and propulsors working alone or in tandem consistent with the entirety of this disclosure. "Pitch," for the purposes of this disclosure refers to an aircraft's angle of attack, which is a difference between a plane including at least a portion of both wings of the aircraft running nose to tail and a horizontal flight trajectory. For example, an aircraft may pitch "up" when its nose is angled upward compared to horizontal flight, as in a climb maneuver. In another example, an aircraft may pitch "down," when its nose is angled downward compared to horizontal flight, like in a dive maneuver. In one or more embodiments, angle of attack may not be used as an input, for instance pilot input, to any system disclosed herein; in such circumstances proxies may be used such as pilot controls, remote controls, or sensor levels, such as true airspeed sensors, pitot tubes, pneumatic/hydraulic sensors, and the like. "Roll" for the purposes of this disclosure, refers to an aircraft's position about its longitudinal axis, which is to say that when an aircraft rotates about its axis from its tail to its nose, and one side rolls upward, as in a banking maneuver. "Yaw," for the purposes of this disclosure, refers to an aircraft's turn angle, when an aircraft rotates about an imaginary vertical axis intersecting center of earth and aircraft 400. "Throttle," for the purposes of this disclosure, refers to an aircraft outputting an amount of thrust from a propulsor. In context of a pilot input, throttle may refer to a pilot's input to increase or decrease thrust produced by at least a propulsor. Flight components 408 may receive and/or transmit signals, for example an aircraft command signal. Aircraft command signal may include any signal described in this disclosure, such as without limitation electrical signal, optical signal, pneumatic signal, hydraulic signal, and/or mechanical signal. In one or more embodiments, an aircraft command may be a function of a signal from a pilot control. In one or more embodiments, an aircraft command may include or be determined as a function of a pilot command. For example, aircraft commands may be determined as a function of a mechanical movement of a throttle. Signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. Pilot control may include circuitry, computing devices, electronic components or a combination thereof that translates pilot input into a signal configured to be transmitted to another electronic component. In one or more embodiments, a plurality of attitude commands may be determined as a function of an input to a pilot control. A plurality of attitude commands may include a total attitude command datum, such as a combination of attitude adjustments represented by one or a certain number of combinatorial datums. A plurality of attitude commands may include individual attitude datums representing total or relative change in attitude measurements relative to pitch, roll, yaw, and throttle.

With continued reference to FIG. 4, in one or more embodiments, pilot control may include at least a sensor. As used in this disclosure, a "sensor" is a device that detects a phenomenon. In one or more embodiments, a sensor may detect a phenomenon and transmit a signal that is representative of the phenomenon. At least a sensor may include, torque sensor, gyroscope, accelerometer, magnetometer, inertial measurement unit (IMU), pressure sensor, force sensor, proximity sensor, displacement sensor, vibration sensor, among others. At least a sensor may include a sensor suite which may include a plurality of sensors that may detect similar or unique phenomena. For example, in a non-limiting embodiment, sensor suite may include a plurality of accelerometers, a mixture of accelerometers and gyroscopes, or a mixture of an accelerometer, gyroscope, and torque sensor. For the purposes of the disclosure, a "torque datum" is one or more elements of data representing one or more parameters detailing power output by one or more propulsors, flight components, or other elements of an electric aircraft. A torque datum may indicate the torque output of at least a flight component 416. At least a flight component 416 may include any propulsor as described herein. In embodiment, at least a flight component 416 may include an electric motor, a propeller, a jet engine, a paddle wheel, a rotor, turbine, or any other mechanism configured to manipulate a fluid medium to propel an aircraft as described herein. an embodiment of at least a sensor may include or be included in, a sensor suite. The herein disclosed system and method may comprise a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In a non-limiting example, there may be four independent sensors housed in and/or on battery pack measuring temperature, electrical characteristic such as voltage, amperage, resistance, or impedance, or any other parameters and/or quantities as described in this disclosure. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability of a battery management system and/or user to detect phenomenon is maintained and in a non-limiting example, a user alter aircraft usage pursuant to sensor readings.

With continued reference to FIG. 4, at least a sensor may include a moisture sensor. "Moisture," as used in this disclosure, is the presence of water, this may include vaporized water in air, condensation on the surfaces of objects, or concentrations of liquid water. Moisture may include humidity. "Humidity," as used in this disclosure, is the property of a gaseous medium (almost always air) to hold water in the form of vapor. An amount of water vapor contained within a parcel of air can vary significantly. Water vapor is generally invisible to the human eye and may be damaging to electrical components. There are three primary measurements of humidity, absolute, relative, specific humidity. "Absolute humidity," for the purposes of this disclosure, describes the water content of air and is expressed in either grams per cubic meters or grams per kilogram. "Relative humidity", for the purposes of this disclosure, is expressed as a percentage, indicating a present stat of absolute humidity relative to a maximum humidity given the same temperature. "Specific humidity," for the purposes of this disclosure, is the ratio of water vapor mass to total moist air parcel mass, where parcel is a given portion of a gaseous medium. A moisture sensor may be psychrometer. A moisture sensor may be a hygrometer. A moisture sensor may be configured to act as or include a humidistat. A "humidistat," for the purposes of this disclosure, is a humidity-triggered switch, often used to control another electronic device. A moisture sensor may use capacitance to measure relative humidity and include in itself, or as an external component, include a device to convert relative humidity measurements to absolute humidity measurements. "Capacitance," for the purposes of this disclosure, is the ability of a system to store an electric charge, in this case the system is a parcel of air which may be near, adjacent to, or above a battery cell.

With continued reference to FIG. 4, at least a sensor may include electrical sensors. An electrical sensor may be configured to measure voltage across a component, electrical current through a component, and resistance of a component. Electrical sensors may include separate sensors to measure each of the previously disclosed electrical characteristics such as voltmeter, ammeter, and ohmmeter, respectively. One or more sensors may be communicatively coupled to at least a pilot control, the manipulation of which, may constitute at least an aircraft command. Signals may include electrical, electromagnetic, visual, audio, radio waves, or another undisclosed signal type alone or in combination. At least a sensor communicatively connected to at least a pilot control may include a sensor disposed on, near, around or within at least pilot control. At least a sensor may include a motion sensor. "Motion sensor," for the purposes of this disclosure refers to a device or component configured to detect physical movement of an object or grouping of objects. One of ordinary skill in the art would appreciate, after reviewing the entirety of this disclosure, that motion may include a plurality of types including but not limited to: spinning, rotating, oscillating, gyrating, jumping, sliding, reciprocating, or the like. At least a sensor may include, torque sensor, gyroscope, accelerometer, torque sensor, magnetometer, inertial measurement unit (IMU), pressure sensor, force sensor, proximity sensor, displacement sensor, vibration sensor, among others. At least a sensor may include a sensor suite which may include a plurality of sensors that may detect similar or unique phenomena. For example, in a non-limiting embodiment, sensor suite may include a plurality of accelerometers, a mixture of accelerometers and gyroscopes, or a mixture of an accelerometer, gyroscope, and torque sensor. The herein disclosed system and method may comprise a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability to detect phenomenon is maintained and in a non-limiting example, a user alter aircraft usage pursuant to sensor readings.

With continued reference to FIG. 4, at least a flight component 416 may include wings, empennages, nacelles, control surfaces, fuselages, and landing gear, among others, to name a few. In embodiments, an empennage may be disposed at the aftmost point of an aircraft body. Empennage may comprise a tail of aircraft 400, further comprising rudders, vertical stabilizers, horizontal stabilizers, stabilators, elevators, trim tabs, among others. At least a portion of empennage may be manipulated directly or indirectly by pilot commands to impart control forces on a fluid in which the aircraft 400 is flying. Manipulation of these empennage control surfaces may, in part, change an aircraft's heading in pitch, roll, and yaw. Wings comprise may include structures which include airfoils configured to create a pressure differential resulting in lift. Wings are generally disposed on a left and right side of aircraft 400 symmetrically, at a point between nose and empennage. Wings may comprise a plurality of geometries in planform view, swept swing, tapered, variable wing, triangular, oblong, elliptical, square, among others. Wings may be blended into the body of the aircraft such as in a BWB 404 aircraft 400 where no strong delineation of body and wing exists. A wing's cross section geometry may comprise an airfoil. An "airfoil" as used in this disclosure, is a shape specifically designed such that a fluid flowing on opposing sides of it exert differing levels of pressure against the airfoil. In embodiments, a bottom surface of an aircraft can be configured to generate a greater pressure than does a top surface, resulting in lift. A wing may comprise differing and/or similar cross-sectional geometries over its cord length, e.g., length from wing tip to where wing meets the aircraft's body. One or more wings may be symmetrical about an aircraft's longitudinal plane, which comprises a longitudinal or roll axis reaching down a center of the aircraft through the nose and empennage, and the aircraft's yaw axis. In one or more embodiments, wings may comprise controls surfaces configured to be commanded by a pilot and/or autopilot to change a wing's geometry and therefore its interaction with a fluid medium. Flight component 416 may include control surfaces. Control surfaces may include without limitation flaps, ailerons, tabs, spoilers, and slats, among others. In one or more embodiments, control surfaces may be disposed on wings in a plurality of locations and arrangements. In one or more embodiments, control surfaces may be disposed at leading and/or trailing edges of wings, and may be configured to deflect up, down, forward, aft, or any combination thereof.

In one or more embodiments, flight component 416 may include a winglet. For the purposes of this disclosure, a "winglet" is a flight component configured to manipulate a fluid medium and is mechanically attached to a wing or aircraft and may alternatively called a "wingtip device." Wingtip devices may be used to improve efficiency of fixed-wing aircraft by reducing drag. Although there are several types of wingtip devices which function in different manners, their intended effect may be to reduce an aircraft's drag by partial recovery of tip vortex energy. Wingtip devices can also improve aircraft handling characteristics and enhance safety for aircraft 400. Such devices increase an effective aspect ratio of a wing without greatly increasing wingspan. Extending wingspan may lower lift-induced drag but would increase parasitic drag and would require boosting the strength and weight of the wing. As a result according to some aeronautic design equations, a maximum wingspan made be determined above which no net benefit exits from further increased span. There may also be operational considerations that limit the allowable wingspan (e.g., available width at airport gates).

Wingtip devices, in one or more embodiments, may increase lift generated at wingtip (by smoothing airflow across an upper wing near the wingtip) and reduce lift-induced drag caused by wingtip vortices, thereby improving a lift-to-drag ratio. This increases fuel efficiency in powered aircraft and increases cross-country speed in gliders, in both cases increasing range. U.S. Air Force studies indicate that a given improvement in fuel efficiency correlates directly and causally with increase in an aircraft's lift-to-drag ratio. The term "winglet" has previously been used to describe an additional lifting surface on an aircraft, like a short section between wheels on fixed undercarriage. An upward angle (i.e., cant) of a winglet, its inward or outward angle (i.e, toe), as well as its size and shape are selectable design parameters which may be chosen for correct performance in a given application. A wingtip vortex, which rotates around from below a wing, strikes a cambered surface of a winglet, generating a force that angles inward and slightly forward. A winglet's relation to a wingtip vortex may be considered analogous to sailboat sails when sailing to windward (i.e., close-hauled). Similar to the close-hauled sailboat's sails, winglets may convert some of what would otherwise be wasted energy in a wingtip vortex to an apparent thrust. This small contribution can be worthwhile over the aircraft's lifetime. Another potential benefit of winglets is that they may reduce an intensity of wake vortices. Wake vortices may trail behind an aircraft 400 and pose a hazard to other aircraft. Minimum spacing requirements between aircraft at airports are largely dictated by hazards, like those from wake vortices. Aircraft are classified by weight (e.g., "Light," "Heavy," and the like) often base upon vortex strength, which grows with an aircraft's lift coefficient. Thus, associated turbulence is greatest at low speed and high weight, which may be produced at high angle of attack near airports. Winglets and wingtip fences may also increase efficiency by reducing vortex interference with laminar airflow near wingtips, by moving a confluence of low-pressure air (over wing) and high-pressure air (under wing) away from a surface of the wing. Wingtip vortices create turbulence, which may originate at a leading edge of a wingtip and propagate backwards and inboard. This turbulence may delaminate airflow over a small triangular section of an outboard wing, thereby frustrating lift in that area. A fence/winglet drives an area where a vortex forms upward away from a wing surface, as the resulting vortex is repositioned to a top tip of the winglet.

With continued reference to FIG. 4, aircraft 400 may include an energy source. Energy source may include any device providing energy to at least a flight component 416, for example at least a propulsors. Energy source may include, without limitation, a generator, a photovoltaic device, a fuel cell such as a hydrogen fuel cell, direct methanol fuel cell, and/or solid oxide fuel cell, or an electric energy storage device; electric energy storage device may include without limitation a battery, a capacitor, and/or inductor. The energy source and/or energy storage device may include at least a battery, battery cell, and/or a plurality of battery cells connected in series, in parallel, or in a combination of series and parallel connections such as series connections into modules that are connected in parallel with other like modules. Battery and/or battery cell may include, without limitation, Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon or titanite anode. In embodiments, the energy source may be used to provide electrical power to an electric or hybrid propulsor during moments requiring high rates of power output, including without limitation takeoff, landing, thermal de-icing and situations requiring greater power output for reasons of stability, such as high turbulence situations. In one or more embodiments, battery may include, without limitation a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. A person of ordinary skill in the art, upon reviewing the entirety of this disclosure, will be aware of various devices of components that may be used as an energy source.

With continued reference to FIG. 4, in further nonlimiting embodiments, an energy source may include a fuel store. As used in this disclosure, a "fuel store" is an aircraft component configured to store a fuel. In one or more embodiments, a fuel store may include a fuel tank. Fuel may include a liquid fuel, a gaseous fluid, a solid fuel, fluid fuel, a plasma fuel, and the like. As used in this disclosure, a "fuel" may include any substance that stores energy. Exemplary non-limiting fuels include hydrocarbon fuels, petroleum-based fuels, synthetic fuels, chemical fuels, Jet fuels (e.g., Jet-A fuel, Jet-B fuel, and the like), kerosene-based fuel, gasoline-based fuel, an electrochemical-based fuel (e.g., lithium-ion battery), a hydrogen-based fuel, natural gas-based fuel, and the like. As described in greater detail below fuel store may be located substantially within blended wing body 404 of aircraft 400, for example without limitation within a wing portion of blended wing body 404. Aviation fuels may include petroleum-based fuels, or petroleum and synthetic fuel blends, used to power aircraft 400. In one or more embodiments, aviation fuels may have more stringent requirements than fuels used for ground use, such as heating and road transport. Aviation fuels may contain additives to enhance or maintain properties important to fuel performance or handling. Fuel may be kerosene-based (JP-8 and Jet A-1), for example for gas turbine-powered aircraft. Piston-engine aircraft may use gasoline-based fuels and/or kerosene-based fuels (for example for Diesel engines). In one or more embodiments, specific energy may be considered an important criterion in selecting fuel for an aircraft 400. Liquid fuel may include Jet-A. Presently Jet-A powers modern commercial airliners and is a mix of extremely refined kerosene and burns at temperatures at or above 49° C. (120° F.). Kerosene-based fuel has a much higher flash point than gasoline-based fuel, meaning that it requires significantly higher temperature to ignite.

With continued reference to FIG. 4, modular aircraft 400 may include an energy source which may include a fuel cell. As used in this disclosure, a "fuel cell" is an electrochemical device that combines a fuel and an oxidizing agent to create electricity. In one or more embodiments, fuel cells are different from most batteries in requiring a continuous source of fuel and oxygen (usually from air) to sustain the chemical reaction, whereas in a battery the chemical energy comes from metals and their ions or oxides that are commonly already present in the battery, except in flow batteries. Fuel cells can produce electricity continuously for as long as fuel and oxygen are supplied.

With continued reference to FIG. 4, in one or more embodiments, fuel cells may consist of different types. Commonly a fuel cell consists of an anode, a cathode, and an electrolyte that allows ions, often positively charged hydrogen ions (protons), to move between two sides of the fuel cell. At anode, a catalyst causes fuel to undergo oxidation reactions that generate ions (often positively charged hydrogen ions) and electrons. Ions move from anode to cathode through electrolyte. Concurrently, electrons may flow from anode to cathode through an external circuit, producing direct current electricity. At cathode, another catalyst causes ions, electrons, and oxygen to react, forming water and possibly other products. Fuel cells may be classified by type of electrolyte used and by difference in startup time ranging from 4 second for proton-exchange membrane fuel cells (PEM fuel cells, or PEMFC) to 10 minutes for solid oxide fuel cells (SOFC). In one or more embodiments, energy source may include a related technology, such as flow batteries. Within a flow battery fuel can be regenerated by recharging. Individual fuel cells produce relatively small electrical potentials, about 0.7 volts. Therefore, in one or more embodiments, fuel cells may be "stacked", or placed in series, to create sufficient voltage to meet an application's requirements. In addition to electricity, fuel cells may produce water, heat and, depending on the fuel source, very small amounts of nitrogen dioxide and other emissions. Energy efficiency of a fuel cell is generally between 40 and 90%.

Fuel cell may include an electrolyte. In one or more embodiments, electrolyte may define a type of fuel cell. Electrolyte may include any number of substances like potassium hydroxide, salt carbonates, and phosphoric acid. Commonly a fuel cell is fueled by hydrogen. Fuel cell may feature an anode catalyst, like fine platinum powder, which breaks down fuel into electrons and ions. Fuel cell may feature a cathode catalyst, often nickel, which converts ions into waste chemicals, with water being the most common type of waste. A fuel cell may include gas diffusion layers that are designed to resist oxidization.

With continued reference to FIG. 4, aircraft 400 may include an energy source which may include a cell such as a battery cell, or a plurality of battery cells making a battery module. An energy source may be a plurality of energy sources. The module may include batteries connected in parallel or in series or a plurality of modules connected either in series or in parallel designed to deliver both the power and energy requirements of the application. Connecting batteries in series may increase the voltage of an energy source which may provide more power on demand. High voltage batteries may require cell matching when high peak load is needed. As more cells are connected in strings, there may exist the possibility of one cell failing which may increase resistance in the module and reduce the overall power output as the voltage of the module may decrease as a result of that failing cell. Connecting batteries in parallel may increase total current capacity by decreasing total resistance, and it also may increase overall amp-hour capacity. The overall energy and power outputs of an energy source may be based on the individual battery cell performance, or an extrapolation based on the measurement of at least an electrical parameter. In an embodiment where an energy source includes a plurality of battery cells, the overall power output capacity may be dependent on the electrical parameters of each individual cell. If one cell experiences high self-discharge during demand, power drawn from an energy source may be decreased to avoid damage to the weakest cell. An energy source may further include, without limitation, wiring, conduit, housing, cooling system and battery management system. Persons skilled in the art will be aware, after reviewing the entirety of this disclosure, of many different components of an energy source.

With continued reference to FIG. 4, aircraft 400 may include multiple flight component 416 sub-systems, each of which may have a separate energy source. For instance, and without limitation, one or more flight components 408 may have a dedicated energy source. Alternatively, or additionally, a plurality of energy sources may each provide power to two or more flight components 408, such as, without limitation, a "fore" energy source providing power to flight components located toward a front of an aircraft 400, while an "aft" energy source provides power to flight components located toward a rear of the aircraft 400. As a further non-limiting example, a flight component of group of flight components may be powered by a plurality of energy sources. For example, and without limitation, two or more energy sources may power one or more flight components; two energy sources may include, without limitation, at least a first energy source having high specific energy density and at least a second energy source having high specific power density, which may be selectively deployed as required for higher-power and lower-power needs. Alternatively, or additionally, a plurality of energy sources may be placed in parallel to provide power to the same single propulsor or plurality of propulsors 420. Alternatively, or additionally, two or more separate propulsion subsystems may be joined using intertie switches (not shown) causing the two or more separate propulsion subsystems to be treatable as a single propulsion subsystem or system, for which potential under load of combined energy sources may be used as the electric potential. Persons skilled in the art, upon reviewing the entirety of this disclosure, will be aware of various combinations of energy sources that may each provide power to single or multiple propulsors in various configurations.

With continued reference to FIG. 4, aircraft 400 may include a flight component 416 that includes at least a nacelle. For the purposes of this disclosure, a "nacelle" is a streamlined body housing, which is sized according to that which is houses, such as without limitation an engine, a fuel store, or a flight component. When attached by a pylon entirely outside an airframe a nacelle may sometimes be referred to as a pod, in which case an engine within the nacelle may be referred to as a podded engine. In some cases an aircraft cockpit may also be housed in a nacelle, rather than in a conventional fuselage. At least a nacelle may substantially encapsulate a propulsor, which may include a motor or an engine. At least a nacelle may be mechanically connected to at least a portion of aircraft 400 partially or wholly enveloped by an outer mold line of the aircraft 400. At least a nacelle may be designed to be streamlined. At least a nacelle may be asymmetrical about a plane comprising the longitudinal axis of the engine and the yaw axis of modular aircraft 400.

With continued reference to FIG. 4, a flight component may include a propulsor. A "propulsor," as used herein, is a component or device used to propel a craft by exerting force on a fluid medium, which may include a gaseous medium such as air or a liquid medium such as water. For the purposes of this disclosure, "substantially encapsulate" is the state of a first body (e.g., housing) surrounding all or most of a second body. A motor may include without limitation, any electric motor, where an electric motor is a device that converts electrical energy into mechanical work for instance by causing a shaft to rotate. A motor may be driven by direct current (DC) electric power; for instance, a motor may include a brushed DC motor or the like. A motor may be driven by electric power having varying or reversing voltage levels, such as alternating current (AC) power as produced by an alternating current generator and/or inverter, or otherwise varying power, such as produced by a switching power source. A motor may include, without limitation, a brushless DC electric motor, a permanent magnet synchronous motor, a switched reluctance motor, and/or an induction motor; persons skilled in the art, upon reviewing the entirety of this disclosure, will be aware of various alternative or additional forms and/or configurations that a motor may take or exemplify as consistent with this disclosure. In addition to inverter and/or switching power source, a circuit driving motor may include electronic speed controllers or other components for regulating motor speed, rotation direction, torque, and/or dynamic braking. Motor may include or be connected to one or more sensors detecting one or more conditions of motor; one or more conditions may include, without limitation, voltage levels, electromotive force, current levels, temperature, current speed of rotation, position sensors, and the like. For instance, and without limitation, one or more sensors may be used to detect back-EMF, or to detect parameters used to determine back-EMF, as described in further detail below. One or more sensors may include a plurality of current sensors, voltage sensors, and speed or position feedback sensors. One or more sensors may communicate a current status of motor to a flight controller and/or a computing device; computing device may include any computing device as described in this disclosure, including without limitation, a flight controller.

With continued reference to FIG. 4, a motor may be connected to a thrust element. Thrust element may include any device or component that converts mechanical work, for example a motor or engine, into thrust in a fluid medium. Thrust element may include, without limitation, a device using moving or rotating foils, including without limitation one or more rotors, an airscrew or propeller, a set of airscrews or propellers such as contra-rotating propellers or co-rotating propellers, a moving or flapping wing, or the like. Thrust element may include without limitation a marine propeller or screw, an impeller, a turbine, a pump-jet, a paddle or paddle-based device, or the like. Thrust element may include a rotor. Persons skilled in the art, upon reviewing the entirety of this disclosure, will be aware of various devices that may be used as thrust element. A thrust element may include any device or component that converts mechanical energy (i.e., work) of a motor, for instance in a form of rotational motion of a shaft, into thrust within a fluid medium. As another non-limiting example, a thrust element may include an eight-bladed pusher propeller, such as an eight-bladed propeller mounted behind the engine to ensure the drive shaft is in compression.

With continued reference to FIG. 4, in nonlimiting embodiments, at least a flight component 416 may include an airbreathing engine such as a jet engine, turbojet engine, turboshaft engine, ramjet engine, scramjet engine, hybrid propulsion system, turbofan engine, or the like. At least a flight component 416 may be fueled by any fuel described in this disclosure, for instance without limitation Jet-A, Jet-B, diesel fuel, gasoline, or the like. In nonlimiting embodiments, a jet engine is a type of reaction engine discharging a fast-moving jet that generates thrust by jet propulsion. While this broad definition can include rocket, water jet, and hybrid propulsion, the term jet engine, in one or more embodiments, refers to an internal combustion airbreathing jet engine such as a turbojet, turbofan, ramjet, or pulse jet. In general, jet engines are internal combustion engines. As used in this disclosure, a "combustion engine" is a mechanical device that is configured to convert mechanical work from heat produced by combustion of a fuel. In one or more embodiments, a combustion engine may operate according to an approximation of a thermodynamic cycle, such as without limitation a Carnot cycle, a Cheng cycle, a Combined cycle, a Brayton cycle, an Otto cycle, an Allam power cycle, a Kalina cycle, a Rankine cycle, and/or the like. In one or more embodiments, a combustion engine may include an internal combustion engine. An internal combustion engine may include heat engine in which combustion of fuel occurs with an oxidizer (usually air) in a combustion chamber that comprises a part of a working fluid flow circuit. Exemplary internal combustion engines may without limitation a reciprocating engine (e.g., 4-stroke engine), a combustion turbine engine (e.g., jet engines, gas turbines, Brayton cycle engines, and the like), a rotary engine (e.g., Wankel engines), and the like. In nonlimiting embodiments, airbreathing jet engines feature a rotating air compressor powered by a turbine, with leftover power providing thrust through a propelling nozzle—this process may be known as a Brayton thermodynamic cycle. Jet aircraft may use such engines for long-distance travel. Early jet aircraft used turbojet engines that were relatively inefficient for subsonic flight. Most modern subsonic jet aircraft use more complex high-bypass turbofan engines. In one or more embodiments, they give higher speed and greater fuel efficiency than piston and propeller aeroengines over long distances. A few air-breathing engines made for highspeed applications (ramjets and scramjets) may use a ram effect of aircraft's speed instead of a mechanical compressor. An airbreathing jet engine (or ducted jet engine) may emit a jet of hot exhaust gases formed from air that is forced into the engine by several stages of centrifugal, axial or ram compression, which is then heated and expanded through a nozzle. In one or more embodiments, a majority of mass flow through an airbreathing jet engine may be provided by air taken from outside of the engine and heated internally, using energy stored in the form of fuel. In one or more embodiments, a jet engine may include turbofans. Alternatively and/or additionally, jet engine may include a turbojets. In one or more embodiments, a turbofan may use a gas turbine engine core with high overall pressure ratio (e.g., 40:1) and high turbine entry temperature (e.g., about 1800 K) and provide thrust with a turbine-powered fan stage. In one or more embodiments, thrust may also be at least partially provided by way of pure exhaust thrust (as in a turbojet engine). In one or more embodiments, a turbofan may have a high efficiency, relative to a turbojet. In one or more embodiments, a jet engine may use simple ram effect (e.g., ramjet) or pulse combustion (e.g., pulsejet) to give compression. Persons skilled in the art, upon reviewing the entirety of this disclosure, will be aware of various devices that may be used as a thrust element.

With continued reference to FIG. 4, an aircraft 400 may include a flight controller. As used in this disclosure, a "flight controller" is a device that generates signals for controlling at least a flight component 416 of an aircraft 400. In one or more embodiments, a flight controller includes electronic circuitry, such as without limitation a digital signal processor (DSP), an application-specific integrated circuit (ASIC), and/or a computing device. Flight controller may use sensor feedback to calculate performance parameters of motor, including without limitation a torque versus speed operation envelope. Persons skilled in the art, upon reviewing the entirety of this disclosure, will be aware of various devices and/or components that may be used as or included in a motor or a circuit operating a motor, as used and described in this disclosure.

With continued reference to FIG. 4, computing device may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device may include a single computing device operating independently, or may include two or more computing device operating in concert, in parallel, sequentially or the like; two or more computing devices may be included together in a single computing device or in two or more computing devices. Computing device may interface or communicate with one or more additional devices as described below in further detail via a network interface device. Network interface device may be utilized for connecting computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device may include but is not limited to, for example, a computing device or cluster of computing devices in a first location and a second computing device or cluster of computing devices in a second location. Computing device may include one or more computing devices dedicated to data storage, security, distribution of traffic for load balancing, and the like. Computing device may distribute one or more computing tasks as described below across a plurality of computing devices of computing device, which may operate in parallel, in series, redundantly, or in any other manner used for distribution of tasks or memory between computing devices. Computing device may be implemented using a "shared nothing" architecture in which data is cached at the worker, in an embodiment, this may enable scalability of system and/or computing device.

With continued reference to FIG. 4, computing device may be designed and/or configured to perform any method, method step, or sequence of method steps in any embodiment described in this disclosure, in any order and with any degree of repetition. For instance, computing device may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 5:
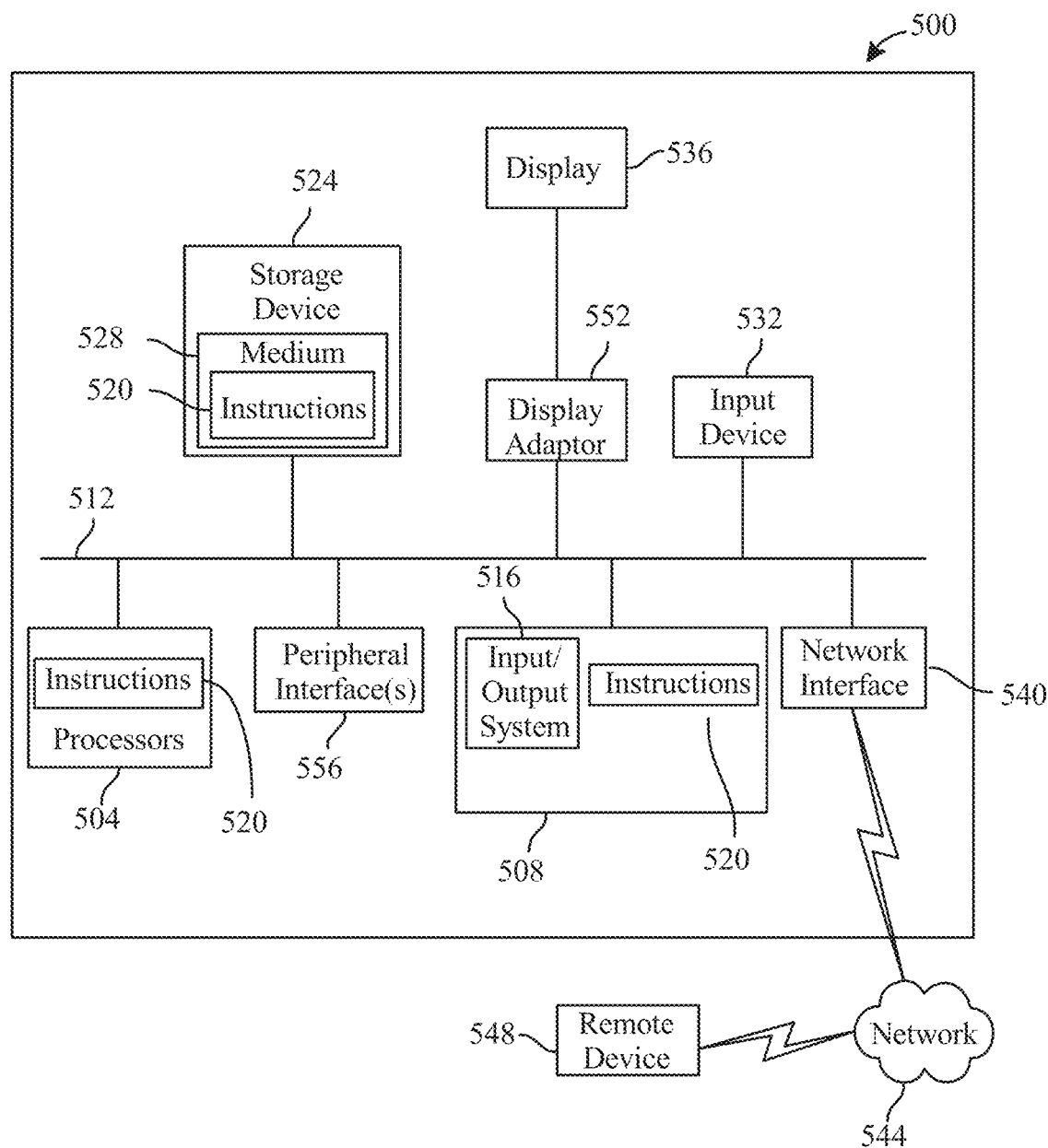
FIG. 5 is a block diagram of a computing system that can be used to implement any one or more of the methodologies disclosed herein and any one or more portions thereof.

FIG. 5 shows a diagrammatic representation of one embodiment of a computing device in the exemplary form of a computer system 500 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 500 includes a processor 504 and a memory 508 that communicate with each other, and with other components, via a bus 512. Bus 512 may include any of several types of bus structures including, but not limited to, a memory bus, a memory controller, a peripheral bus, a local bus, and any combinations thereof, using any of a variety of bus architectures.

Processor 504 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 504 may be organized according to Von Neumann and/or Harvard architecture as a non-limiting example. Processor 504 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 508 may include various components (e.g., machine-readable media) including, but not limited to, a random-access memory component, a read only component, and any combinations thereof. In one example, a basic input/output system 516 (BIOS), including basic routines that help to transfer information between elements within computer system 500, such as during start-up, may be stored in memory 508. Memory 508 may also include (e.g., stored on one or more machine-readable media) instructions (e.g., software) 520 embodying any one or more of the aspects and/or methodologies of the present disclosure. In another example, memory 508 may further include any number of program modules including, but not limited to, an operating system, one or more application programs, other program modules, program data, and any combinations thereof.

Computer system 500 may also include a storage device 524. Examples of a storage device (e.g., storage device 524) include, but are not limited to, a hard disk drive, a magnetic disk drive, an optical disc drive in combination with an optical medium, a solid-state memory device, and any combinations thereof. Storage device 524 may be connected to bus 512 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 524 (or one or more components thereof) may be removably interfaced with computer system 500 (e.g., via an external port connector (not shown)). Particularly, storage device 524 and an associated machine-readable medium 528 may provide nonvolatile and/or volatile storage of machine-readable instructions, data structures, program modules, and/or other data for computer system 500. In one example, software 520 may reside, completely or partially, within machine-readable medium 528. In another example, software 520 may reside, completely or partially, within processor 504.

Computer system 500 may also include an input device 532. In one example, a user of computer system 500 may enter commands and/or other information into computer system 500 via input device 532. Examples of an input device 532 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 532 may be interfaced to bus 512 via any of a variety of interfaces (not shown) including, but not limited to, a serial interface, a parallel interface, a game port, a USB interface, a FIREWIRE interface, a direct interface to bus 512, and any combinations thereof. Input device 532 may include a touch screen interface that may be a part of or separate from display 536, discussed further below. Input device 532 may be utilized as a user selection device for selecting one or more graphical representations in a graphical interface as described above.

A user may also input commands and/or other information to computer system 500 via storage device 524 (e.g., a removable disk drive, a flash drive, etc.) and/or network interface device 540. A network interface device, such as network interface device 540, may be utilized for connecting computer system 500 to one or more of a variety of networks, such as network 544, and one or more remote devices 548 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 544, may employ a wired and/or a wireless mode of communication. In general, any network topology may be used. Information (e.g., data, software 520, etc.) may be communicated to and/or from computer system 500 via network interface device 540.

Computer system 500 may further include a video display adapter 552 for communicating a displayable image to a display device, such as display device 536. Examples of a display device include, but are not limited to, a liquid crystal display (LCD), a cathode ray tube (CRT), a plasma display, a light emitting diode (LED) display, and any combinations thereof. Display adapter 552 and display device 536 may be utilized in combination with processor 504 to provide graphical representations of aspects of the present disclosure. In addition to a display device, computer system 500 may include one or more other peripheral output devices including, but not limited to, an audio speaker, a printer, and any combinations thereof. Such peripheral output devices may be connected to bus 512 via a peripheral interface 556. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A blended wing body (BWB) aircraft comprising:
a blended wing body having a main body and wings with no clear demarcation between the wings and the main body along leading edges of the BWB aircraft;
a passenger cabin located within the main body;
a galley comprising a triangular shape, inboard relative to the passenger cabin; and
more than one passenger bays located within the passenger cabin, wherein a perimeter of at least one passenger bay is demarcated by at least a divider and wherein the at least one passenger bay is substantially parallel to at least one leading edge of the BWB aircraft, wherein the more than one passenger bays are laterally adjacent to the galley.

2. The BWB aircraft of claim 1, wherein the at least one passenger bay is oriented in a non-parallel direction relative to one or more passenger bays of the more than one passenger bays.

3. The BWB aircraft of claim 1, wherein:
the BWB aircraft comprises a pressure vessel, wherein the pressure vessel comprises at least the passenger cabin; and
the at least a divider comprises a structural element, wherein the structural element is configured to contain the pressure vessel of the BWB aircraft.

4. The BWB aircraft of claim 1, wherein the at least a divider is substantially parallel to the at least one leading edge of the BWB aircraft.

5. The BWB aircraft of claim 1, wherein the BWB aircraft comprises high wing geometry where the wing is higher than a vertical center of the aircraft.

6. The BWB aircraft of claim 1, wherein each passenger bay of the more than one passenger bays comprises a bay aisle and wherein at least one bay aisle is substantially parallel to the at least one leading edge of the BWB aircraft.

7. The BWB aircraft of claim 6, wherein:
the passenger cabin further comprises at least one cross aisle extending laterally from a direction of a first wing towards a second wing of the BWB aircraft; and
the at least one bay aisle is situated non-orthogonally relative to the at least one cross aisle.

8. The BWB aircraft of claim 1, wherein:
the at least one passenger bay comprises a first passenger bay and a second passenger bay;
the at least a divider of the first passenger bay is substantially parallel to a first leading edge of the BWB aircraft; and
the at least a divider of the second passenger bay is substantially parallel to a second leading edge of the BWB aircraft.

9. The BWB aircraft of claim 8, wherein the first passenger bay is oriented in a non-parallel direction relative to the second passenger bay.

10. The BWB aircraft of claim 8, wherein;
the first passenger bay and the second passenger bay are situated outboard relative to the galley.

11. A blended wing body (BWB) aircraft comprising:
a blended wing body having a main body and wings with no clear demarcation between the wings and the main body along leading edges of the BWB aircraft;
a passenger cabin located within the main body; and
a galley comprising a triangular shape, inboard relative to the passenger cabin;
more than one passenger bays located within the passenger cabin, wherein a perimeter of at least one passenger bay is demarcated by at least a divider, and wherein the at least one passenger bay is situated along at least one leading edge of the BWB aircraft, wherein the more than one passenger bays are laterally adjacent to the galley.

12. The BWB aircraft of claim 11, wherein:
the BWB aircraft comprises a pressure vessel, wherein the pressure vessel comprises at least the passenger cabin; and
the at least a divider comprises a structural element, wherein the structural element is configured to contain the pressure vessel of the BWB aircraft.

13. The BWB aircraft of claim 11, wherein:
the at least a divider separates the galley from the at least one passenger bay.

14. The BWB aircraft of claim 11, wherein:
the at least one passenger bay comprises a plurality of passenger columns; and
the plurality of passenger columns are substantially parallel to the at least one leading edge of the BWB aircraft.

15. The BWB aircraft of claim 11, wherein each passenger bay of the more than one passenger bays comprises a bay aisle and wherein at least one bay aisle is substantially parallel to the at least one leading edge of the BWB aircraft.

16. The BWB aircraft of claim 15, wherein:
the passenger cabin further comprises at least one cross aisle extending laterally from a direction of a first wing towards a direction of a second wing of the BWB aircraft; and
the at least one bay aisle is situated non-orthogonally relative to the at least one cross aisle.

17. The BWB aircraft of claim 11, wherein:
the at least one passenger bay comprises a first passenger bay and a second passenger bay;
the at least a divider of the first passenger bay is substantially parallel to a first leading edge of the BWB aircraft; and
the at least a divider of the second passenger bay is substantially parallel to a second leading edge of the BWB aircraft.

18. The BWB aircraft of claim 17, wherein the first leading edge is located on an opposing side of BWB aircraft relative to the second leading edge.

19. The BWB aircraft of claim 17, wherein the first passenger bay is oriented in a non-parallel direction relative to the second passenger bay.

20. The BWB aircraft of claim 17, wherein:
the first passenger bay and the second passenger bay are situated outboard passenger cabin relative to the galley.

* * * * *